(12) United States Patent
Wang et al.

(10) Patent No.: US 11,979,247 B2
(45) Date of Patent: May 7, 2024

(54) MESSAGE FORWARDING METHOD AND APPARATUS

(71) Applicant: HUAWEI TECHNOLOGIES CO., LTD., Shenzhen (CN)

(72) Inventors: Yaxin Wang, Beijing (CN); Yan Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/945,258

(22) Filed: Sep. 15, 2022

(65) Prior Publication Data

US 2023/0020443 A1 Jan. 19, 2023

Related U.S. Application Data

(63) Continuation of application No. PCT/CN2020/080070, filed on Mar. 18, 2020.

(51) Int. Cl.
*H04L 12/18* (2006.01)
*H04L 67/141* (2022.01)
*H04W 76/10* (2018.01)

(52) U.S. Cl.
CPC .......... *H04L 12/185* (2013.01); *H04L 67/141* (2013.01); *H04W 76/10* (2018.02)

(58) Field of Classification Search
CPC ... H04L 12/185; H04L 65/611; H04L 67/141; H04W 76/10

(Continued)

(56) References Cited

U.S. PATENT DOCUMENTS 8,132,000 B2 * 3/2012 Lebovitz ............... H04L 12/185
                                              713/153
9,049,030 B1 * 6/2015 Pogde ..................... H04L 12/18
(Continued)

FOREIGN PATENT DOCUMENTS

CN 109391909 A 2/2019
CN 109769150 A 5/2019
(Continued)

OTHER PUBLICATIONS

Qualcomm Incorporated, Nokia, Nokia Shanghai Bell, Solution: Integrated Multicast and Unicast Transport with Full Separation of MBS Service. SA WG2 Meeting #136-AH, Incheon, South Korea, Jan. 13-17, 2020, S2-2001705, 7 pages.
(Continued)

*Primary Examiner* — Ruolei Zong
(74) *Attorney, Agent, or Firm* — HUAWEI TECHNOLOGIES CO., LTD.

(57) ABSTRACT

Embodiments of this application provide a message forwarding method and an apparatus, so that a message for joining a multicast group is sent to a multicast user plane network element, and the multicast user plane network element is triggered to establish a tunnel for transmitting multicast data between the multicast user plane network element and an application server. The method may include: a multicast session management network element receives the message that indicates that a terminal is joining the multicast group; and when the terminal is the 1$^{st}$ terminal the multicast group, sends, to the multicast user plane network element, a message that requests to establish the tunnel for transmitting the multicast data between the multicast user plane network element and the application server.

20 Claims, 17 Drawing Sheets

(58) Field of Classification Search
USPC .......................................................... 709/206
See application file for complete search history.

(56) References Cited

U.S. PATENT DOCUMENTS

| | | | |
|---|---|---|---|
| 2003/0156540 A1* | 8/2003 | Trossen | H04L 12/1836 370/332 |
| 2009/0303902 A1* | 12/2009 | Liu | H04L 12/189 370/254 |
| 2020/0267513 A1 | 8/2020 | Zhu et al. | |
| 2021/0274323 A1* | 9/2021 | Xu | H04W 4/08 |
| 2022/0264378 A1* | 8/2022 | Zong | H04W 36/0058 |

FOREIGN PATENT DOCUMENTS

| | | | | |
|---|---|---|---|---|
| CN | 110366131 A | 10/2019 | | |
| WO | WO-2008046337 A1 * | 4/2008 | ........ | H04W 36/0055 |
| WO | 2019091456 A1 | 5/2019 | | |
| WO | WO-2019085822 A1 * | 5/2019 | ........... | H04L 12/185 |

OTHER PUBLICATIONS

Nokia, Alcatel-Lucent Shanghai Bell, 23.501 5.8: IP address allocation for a PDU session and forwarding realms. SA WG2 Meeting #122, Jun. 26-30, 2017, Los Cabos, Mexico, S2-174716, 4 pages.

3GPP TR 23.757 V0.3.0 (Jan. 2020), 3rd Generation Partnership Project; Technical Specification Group Services and System Aspects; Study on architectural enhancements for 5G multicast-broadcast services(Release 17), 37 pages.

3GPP TS 23.501 V16.3.0 (Dec. 2019), 3rd Generation Partnership Project; Technical Specification Group Services and System Aspects; System architecture for the 5G System (5GS); Stage 2(Release 16), 417 pages.

3GPP TS 23.316 V16.2.0 (Dec. 2019), 3rd Generation Partnership Project; Technical Specification Group Services and System Aspects; Wireless and wireline convergence access support for the 5G System (5GS)(Release 16), 80 pages.

3GPP TS 23.502 V16.3.0 (Dec. 2019), 3rd Generation Partnership Project; Technical Specification Group Services and System Aspects; Procedures for the 5G System (5GS); Stage 2(Release 16), 558 pages.

3GPP TS 24.501 V16.3.0 (Dec. 2019), 3rd Generation Partnership Project; Technical Specification Group Core Network and Terminals; Non-Access-Stratum (NAS) protocol for 5G System (5GS); Stage 3(Release 16), 643 pages.

* cited by examiner

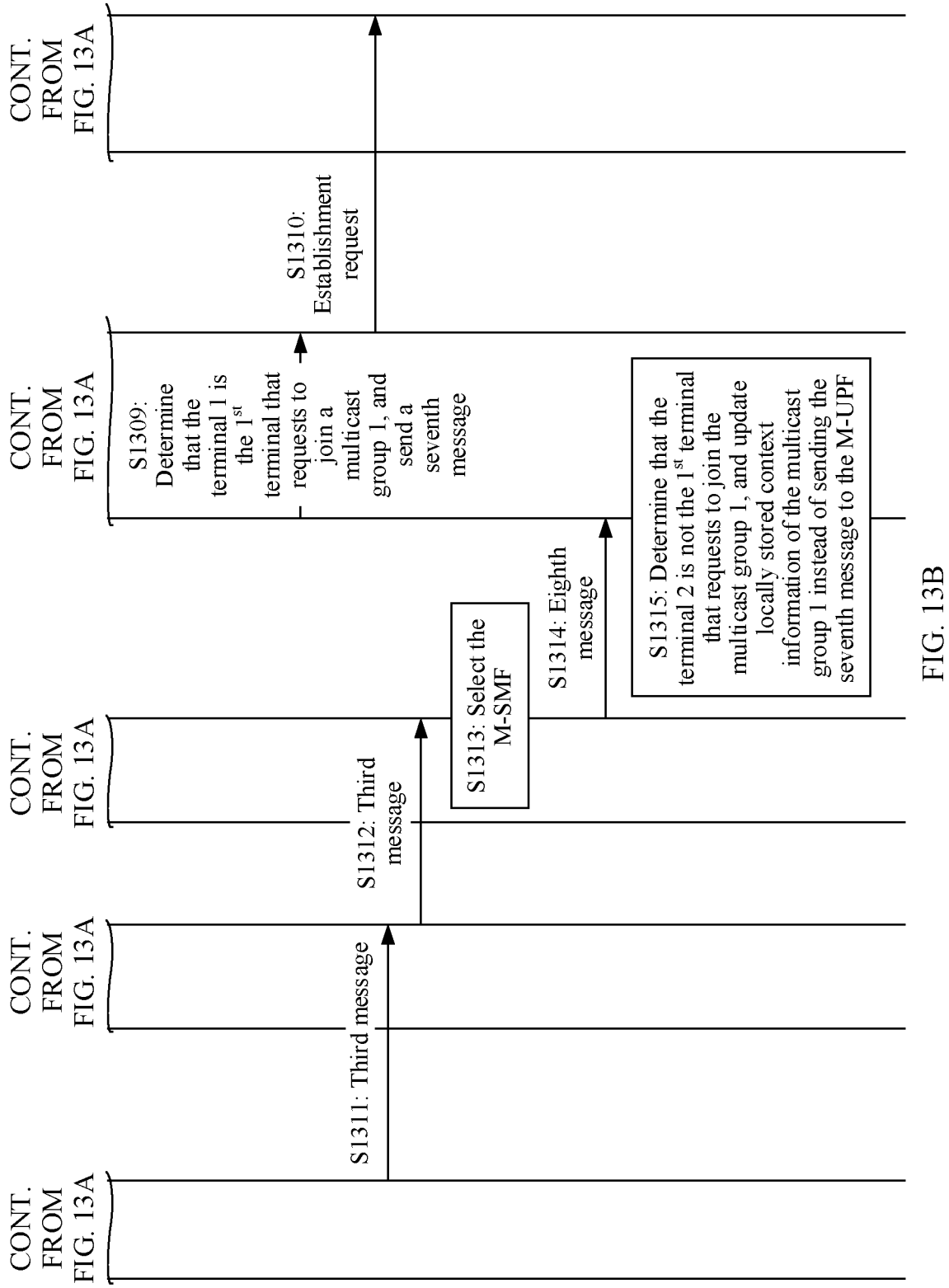

MESSAGE FORWARDING METHOD AND APPARATUS

CROSS-REFERENCE TO RELATED APPLICATIONS

This application is a continuation of International Application No. PCT/CN2020/080070, filed on Mar. 18, 2020, the disclosure of which is hereby incorporated by reference in its entirety.

TECHNICAL FIELD

Embodiments of this application relate to the wireless communication field, and in particular, to a message forwarding method and an apparatus.

BACKGROUND

In a 3rd generation partnership project (3GPP) network, there is a requirement for multicast communication/groupcast communication. For example, a plurality of terminals may join a same multicast group, and request same data from a network side device.

Currently, a terminal joins a multicast group by using a multicast message that requests to join the multicast group, for example, an internet group management protocol (IGMP) message. For example, the terminal sends the IGMP message to a unicast user plane function (UPF) through a unicast packet data unit (PDU) session established for the terminal by a network, and the unicast UPF forwards the IGMP message to an application server that provides multicast data. After receiving the IGMP message sent by the unicast UPF, the application server determines that the multicast data needs to be sent to the terminal, establishes a connection to the unicast UPF, and sends the multicast data to the terminal through the unicast UPF. In this manner, if a plurality of terminals simultaneously request to join the multicast group, the application server needs to make a plurality of copies of the multicast data, and sends the plurality of copies of the multicast data to the plurality of terminals in the multicast group through a unicast UPF corresponding to a PDU session of each terminal. Consequently, a large quantity of UPFs need to be used, and a large quantity of transmission resources are occupied.

In a current technology, to save transmission resources on a network side and an air interface, considering that a plurality of UEs need to share a same UPF for a multicast service, a multicast UPF may be disposed in the network, and the multicast UPF transmits multicast data to the plurality of UEs in a multicast group. However, currently, no related solution is available to resolve a problem of how to send a multicast message to the multicast UPF, so that the multicast UPF establishes a connection to an application server based on the multicast message, to implement normal forwarding of the multicast data.

SUMMARY

Embodiments of this application provide a message forwarding method and an apparatus, to resolve a problem of how to forward a multicast message to a multicast user plane network element.

To achieve the foregoing objectives, the following technical solutions are used in embodiments of this application.

According to a first aspect, an embodiment of this application provides a message forwarding method. The method includes: A multicast user plane network element receives, from a multicast session management network element, a first message that indicates that a first terminal is joining a multicast group. The multicast user plane network element is configured to transmit multicast data corresponding to the multicast group. The multicast session management network element is configured to manage a multicast service corresponding to the multicast group, or the multicast session management network element is a session management network element that manages the multicast user plane network element. If the first terminal is the $1^{st}$ terminal joining the multicast group, the multicast user plane network element sends, to an application server, a second message that requests to establish a tunnel for transmitting the multicast data between the multicast user plane network element and the application server.

According to the method in the first aspect, the multicast user plane network element may receive, from the multicast session management network element, the message that indicates that the terminal is joining the multicast group; when the terminal is the $1^{st}$ terminal that requests to join the multicast group, send the message to the application server, to request the application server to establish the transmission tunnel between the multicast user plane network element and the application server; and send the multicast data to the terminal in the multicast group through the transmission tunnel. This implements normal forwarding of the multicast data, and provides a solution of forwarding the message for joining the multicast group from the multicast session management network element to the multicast user plane network element and from the multicast user plane network element to the application server. In addition, when the $1^{st}$ terminal initiates a request for joining the multicast group, establishment of the tunnel between the application server and the multicast user plane network element is triggered, and the multicast data is sent, through the tunnel, to the terminal in the multicast group through the multicast user plane network element. There is no need to send, for each terminal that requests to join the multicast group, the message that requests to establish the tunnel between the application server and the multicast user plane network element, so that signaling overheads are reduced.

In a possible design, with reference to the first aspect, that the multicast user plane network element receives the first message from the multicast session management network element includes: The multicast user plane network element receives the first message from a unicast user plane network element through the multicast session management network element, where the unicast user plane network element corresponds to the first terminal.

According to the possible design, the first message may be sent by the unicast user plane network element to the multicast session management network element, and sent by the multicast session management network element to the multicast user plane network element. In other words, the message that is found by the unicast user plane network element through detection and that requests to join the multicast group is forwarded by the multicast session management network element to the multicast user plane network element, and then sent by the multicast user plane network element to the application server. This ensures that the user-plane message that requests to join the multicast group can be sent to the application server along a correct forwarding path, and implements normal forwarding of the multicast data.

In a possible design, with reference to any one of the first aspect or the possible designs of the first aspect, the method further includes: The multicast user plane network element determines that the first terminal is the $1^{st}$ terminal joining the multicast group.

According to the possible design, the multicast user plane network element may determine the terminal that requests to join the multicast group, to ensure that a process in which the multicast user plane network element sends the second message to the application server is performed only when the terminal is the $1^{st}$ terminal joining the multicast group, so that signaling overheads are reduced.

In a possible design, with reference to any one of the first aspect or the possible designs of the first aspect, that the multicast user plane network element determines that the first terminal is the $1^{st}$ terminal joining the multicast group includes: when context information of the multicast group does not exist locally in the multicast user plane network element, determining that the first terminal is the $1^{st}$ terminal joining the multicast group; or when context information the multicast group existing locally in the multicast user plane network element does not include terminal information, determining that the first terminal is the $1^{st}$ terminal joining the multicast group.

According to the possible design, the multicast user plane network element may determine, based on the locally stored context information of the multicast group, whether the first terminal is the $1^{st}$ terminal that requests to join the multicast group. The determining method is simple and easy to implement.

In a possible design, with reference to any one of the first aspect or the possible designs of the first aspect, the method further includes: The multicast user plane network element receives, from the multicast session management network element, a third message that indicates that a second terminal is joining the multicast group. In this case, that the multicast user plane network element sends the second message to the application server includes: The multicast user plane network element sends one second message to the application server.

According to the possible design, when receiving messages that are initiated by two or more terminals and that request to join a same multicast group, the multicast user plane network element may suppress the received messages, reserve a message initiated by the $1^{st}$ terminal, and send the message to the application server, without sending a plurality of messages to the application server. This reduces signaling overheads and power consumption that is caused when the multicast user plane network element sends the messages to the application server.

In a possible design, with reference to any one of the first aspect or the possible designs of the first aspect, the first message is an IGMP message, and the second message is the IGMP message or a protocol independent multicast (PIM) message. Alternatively, the first message is a multicast listener discovery protocol (MLD) message, and the second message is the MLD message or a PIM message.

According to the possible design, the message that requests to join the multicast group may be a multicast protocol message such as the IGMP message or the MLD message, and the message that requests to establish the tunnel between the multicast user plane network element and the application server may be a message such as the IGMP message, the MLD message, or the PIM message. This ensures flexible and diversified message implementations, and increases application scenarios of the method.

In a possible design, with reference to any one of the first aspect or the possible designs of the first aspect, the method further includes: The multicast user plane network element preconfigures an execution rule, where the execution rule includes: establishing the tunnel with the application server when receiving the IGMP message from the multicast session management network element; or establishing the tunnel with the application server when receiving the MLD message from the multicast session management network element.

According to the possible design, the execution rule may be preconfigured in the multicast user plane network element, and the message that requests to join the multicast group and that is received from the control plane is forwarded to the application server according to the execution rule. This is simple and easy to implement.

In a possible design, with reference to any one of the first aspect or the possible designs of the first aspect, the method further includes: The multicast user plane network element receives, from the multicast session management network element, a fourth message that indicates that a third terminal is leaving the multicast group. If the third terminal is the last terminal that is leaving the multicast group, the multicast user plane network element sends, to the application server, a fifth message that requests to release the tunnel for transmitting the multicast data.

According to the possible design, when learning that the last terminal in the terminals that have joined the multicast group is leaving the multicast group, the multicast user plane network element may send the request to the application server, to request to release the tunnel for transmitting the multicast data, so that a transmission resource is released, and resource utilization is improved.

In a possible design, with reference to any one of the first aspect or the possible designs of the first aspect, the establishing a tunnel for transmitting the multicast data between the multicast user plane network element and the application server includes: establishing an N6 multicast distribution tree associated with the multicast group in which the application server is used as a data source, and connecting the multicast user plane network element to the N6 multicast distribution tree, where N6 is an interface between the multicast user plane network element and a data network (DN), the DN is connected to the application server, and the multicast distribution tree is a forwarding path between a sender and a receiver of the multicast data.

According to the possible design, the multicast user plane network element and the application server may be configured, by using the N6 multicast distribution tree, as two parties for sending and receiving the multicast data. The multicast data is sent to the multicast user plane network element through transmission by using the N6 multicast distribution tree, and sent by the multicast user plane network element to the terminal in the multicast group. This is simple and easy to implement.

According to a second aspect, this application provides a communication apparatus. The communication apparatus may be a multicast user plane network element, or a chip or a system on chip in the multicast user plane network element. The communication apparatus may implement a function performed by the communication apparatus in any one of the first aspect or the possible designs of the first aspect. The function may be implemented by hardware, or may be implemented by hardware executing corresponding software. The hardware or the software includes one or more modules corresponding to the function. For example, the communication apparatus may include a receiving unit and a sending unit.

The receiving unit is configured to receive, from a multicast session management network element, a first message that indicates that a first terminal is joining a multicast group. The multicast session management network element is configured to manage a multicast service corresponding to the multicast group, or the multicast session management network element is a session management network element that manages the multicast user plane network element. The multicast user plane network element is configured to transmit multicast data corresponding to the multicast group.

The sending unit is configured to: if the first terminal is the $1^{st}$ terminal joining the multicast group, send, to an application server, a second message that requests to establish a tunnel for transmitting the multicast data between the multicast user plane network element and the application server.

For a specific implementation of the communication apparatus, refer to behavior functions of the multicast user plane network element in the message forwarding method provided in any one of the first aspect or the possible designs of the first aspect. Details are not described herein again. Therefore, the provided communication apparatus can achieve same beneficial effects as any one of the first aspect or the possible designs of the first aspect.

According to a third aspect, a communication apparatus is provided. The communication apparatus may be a multicast user plane network element, or a chip or a system on chip in the multicast user plane network element. The communication apparatus may implement a function performed by the multicast user plane network element in any one of the first aspect or the possible designs of the first aspect. The function may be implemented by hardware. In a possible design, the communication apparatus may include a processor and a communication interface. The processor may be configured to support the communication apparatus in implementing the function related to the multicast user plane network element in any one of the first aspect or the possible designs of the first aspect. For example, the processor is configured to: receive, from a multicast session management network element through the communication interface, a first message that indicates that a first terminal is joining a multicast group; and if the first terminal is the $1^{st}$ terminal joining the multicast group, send, to an application server through the communication interface, a second message that requests to establish a tunnel for transmitting multicast data between the multicast user plane network element and the application server. The multicast session management network element is configured to manage a multicast service corresponding to the multicast group, or the multicast session management network element is a session management network element that manages the multicast user plane network element. The multicast user plane network element is configured to transmit the multicast data corresponding to the multicast group. In another possible design, the communication apparatus may further include a memory. The memory is configured to store computer-executable instructions and data that are necessary for the communication apparatus. When the communication apparatus runs, the processor executes the computer-executable instructions stored in the memory, to enable the communication apparatus to perform the message forwarding method according to any one of the first aspect or the possible designs of the first aspect.

According to a fourth aspect, a computer-readable storage medium is provided. The computer-readable storage medium stores instructions. When the instructions are run on a computer, the computer is enabled to perform the message forwarding method according to any one of the first aspect or the possible designs of the first aspect.

According to a fifth aspect, a computer program product including instructions is provided. When the computer program product runs on a computer, the computer is enabled to perform the message forwarding method according to any one of the first aspect or the possible designs of the first aspect.

According to a sixth aspect, a chip system is provided. The chip system includes a processor and a communication interface, and is configured to support a communication apparatus in implementing a function related to the multicast user plane network element in any one of the first aspect or the possible designs of the first aspect. For example, the processor receives, from a multicast session management network element through the communication interface, a first message that indicates that a first terminal is joining a multicast group; and if the first terminal is the $1^{st}$ terminal joining the multicast group, sends, to an application server through the communication interface, a second message that requests to establish a tunnel for transmitting multicast data between the multicast user plane network element and the application server. The multicast session management network element is configured to manage a multicast service corresponding to the multicast group, or the multicast session management network element is a session management network element that manages the multicast user plane network element. The multicast user plane network element is configured to transmit the multicast data corresponding to the multicast group. In a possible design, the chip system further includes a memory. The memory is configured to store program instructions and data that are necessary for the communication apparatus. The chip system may include a chip, or may include a chip and another discrete component.

For technical effects achieved by any one of the design manners of the third aspect to the sixth aspect, refer to the technical effects achieved by any one of the first aspect or the possible designs of the first aspect. Details are not described again.

According to a seventh aspect, an embodiment of this application further provides a message forwarding method. The method further includes: The multicast session management network element receives a sixth message that indicates that a first terminal is joining a multicast group. The multicast session management network element is configured to manage a multicast service corresponding to the multicast group. In other words, the multicast session management network element is a session management network element that manages a multicast user plane network element. The multicast user plane network element is an anchor for transmitting multicast data. If the first terminal is the $1^{st}$ terminal joining the multicast group, the multicast session management network element sends, to the multicast user plane network element that is configured to transmit the multicast data, a seventh message that requests to establish a tunnel for transmitting the multicast data between the multicast user plane network element and an application server.

In a possible design, with reference to the seventh aspect, that the multicast session management network element receives a sixth message includes: The multicast session management network element receives the sixth message from a unicast user plane network element, where the unicast user plane network element corresponds to the first terminal. Alternatively, the multicast session management network element receives the sixth message from a unicast user plane network element through a unicast session management network element, where the unicast session management network element is a session management network element that manages the unicast user plane network element.

According to the possible design, the sixth message may be sent by the unicast user plane network element or the unicast session management network element to the multicast session management network element, sent by the multicast session management network element to the multicast user plane network element, and then sent by the multicast user plane network element to the application server. This ensures that the user-plane message that requests to join the multicast group can be sent to the application server along a correct forwarding path, and implements normal forwarding of the multicast data.

In a possible design, with reference to any one of the seventh aspect or the possible designs of the seventh aspect, the method further includes: The multicast session management network element determines that the first terminal is the $1^{st}$ terminal joining the multicast group.

According to the possible design, the multicast session management network element may determine the terminal that requests to join the multicast group, to ensure that a process in which the multicast session management network element sends the seventh message to the multicast user plane network element is performed only when the terminal is the $1^{st}$ terminal joining the multicast group, so that signaling overheads are reduced.

In a possible design, with reference to any one of the seventh aspect or the possible designs of the seventh aspect, that the multicast session management network element determines that the first terminal is the $1^{st}$ terminal joining the multicast group includes: when context information of the multicast group does not exist locally in the multicast session management network element, determining that the first terminal is the $1^{st}$ terminal joining the multicast group; or when context information of the multicast group existing locally in the multicast session management network element does not include terminal information, determine that the first terminal is the $1^{st}$ terminal joining the multicast group.

According to the possible design, the multicast session management network element may determine, based on the locally stored context information of the multicast group, whether the first terminal is the $1^{st}$ terminal that requests to join the multicast group. The determining method is simple and easy to implement.

In a possible design, with reference to any one of the seventh aspect or the possible designs of the seventh aspect, the method further includes: The multicast session management network element receives an eighth message that indicates that a second terminal is joining the multicast group. In this case, that the multicast session management network element sends the seventh message to the multicast user plane network element includes: The multicast session management network element sends one seventh message to the multicast user plane network element.

According to the possible design, when receiving messages that are initiated by two or more terminals and that request to join a same multicast group, the multicast session management network element may suppress the received messages, reserve a message initiated by the $1^{st}$ terminal, and send the message to the multicast user plane network element, without sending a message to the multicast user plane network element for a plurality of times. This reduces signaling overheads and power consumption that is caused when the multicast session management network element sends the messages to the application server.

In a possible design, with reference to any one of the seventh aspect or the possible designs of the seventh aspect, the sixth message is a user plane event notification message or a control plane message, and the seventh message is an IGMP message, an MLD message, or signaling indication information. Alternatively, the sixth message is an IGMP message, and the seventh message is the IGMP message or signaling indication information. Alternatively, the sixth message is an MLD message, and the seventh message is the MLD message or signaling indication information.

According to the possible design, the message that requests to join the multicast group and that is sent by the multicast session management network element may be a message such as the user plane event notification message, the control plane message, the IGMP message, or the MLD message, and the message that requests to establish the tunnel between the multicast user plane network element and the application server and that is sent by the multicast session management network element may be a multicast protocol message such as the IGMP message or the MLD message. This ensures flexible and diversified message implementations, and increases application scenarios of the method.

In a possible design, with reference to any one of the seventh aspect or the possible designs of the seventh aspect, the method further includes: The multicast session management network element receives a ninth message that indicates that a third terminal is leaving the multicast group. If the third terminal is the last terminal that is leaving the multicast group, the multicast session management network element sends a tenth message to the multicast user plane network element, where the tenth message requests to release the tunnel for transmitting the multicast data.

According to the possible design, when learning that the last terminal in the terminals that have joined the multicast group is leaving the multicast group, the multicast session management network element may send the request to the multicast user plane network element, to request to release the tunnel for transmitting the multicast data, so that a transmission resource is released, and resource utilization is improved.

In a possible design, with reference to any one of the seventh aspect or the possible designs of the seventh aspect, the establishing a tunnel for transmitting the multicast data between the multicast user plane network element and the application server includes: establishing an N6 multicast distribution tree associated with the multicast group in which the application server is used as a data source, and connecting the multicast user plane network element to the N6 multicast distribution tree, where N6 is an interface between the multicast user plane network element and a data network DN, the DN is connected to the application server, and the multicast distribution tree is a forwarding path between a sender and a receiver of the multicast data.

According to the possible design, the multicast user plane network element and the application server may be configured, by using the N6 multicast distribution tree, as two parties for sending and receiving the multicast data. The multicast data is sent to the multicast user plane network element through transmission by using the N6 multicast distribution tree, and sent by the multicast user plane network element to the terminal in the multicast group. This is simple and easy to implement.

According to an eighth aspect, a communication apparatus is provided. The communication apparatus may be a multicast session management network element, or a chip or a system on chip in the multicast session management network element. The communication apparatus may implement functions performed by the multicast session network element in the foregoing aspect or the possible designs, and the functions may be implemented by hardware, or may be implemented by hardware executing corresponding software. The hardware or the software includes one or more modules corresponding to the functions. For example, the communication apparatus may include a receiving unit and a sending unit.

The receiving unit is configured to receive a sixth message that indicates that a first terminal is joining a multicast group. The multicast session management network element is configured to manage a multicast service corresponding to the multicast group. In other words, the multicast session management network element is a session management network element that manages a multicast user plane network element. The multicast user plane network element is an anchor for transmitting multicast data.

The sending unit is configured to: if the first terminal is the $1^{st}$ terminal joining the multicast group, send, to the multicast user plane network element configured to transmit the multicast data, a seventh message that requests to establish a tunnel for transmitting the multicast data between the multicast user plane network element and an application server.

For a specific implementation of the communication apparatus, refer to behavior functions of the multicast session management network element in the message forwarding method provided in any one of the seventh aspect or the possible designs of the seventh aspect. Details are not described herein again. Therefore, the provided communication apparatus can achieve same beneficial effects as any one of the seventh aspect or the possible designs of the seventh aspect.

According to a ninth aspect, a communication apparatus is provided. The communication apparatus may be a multicast session management network element, or a chip or a system on chip in the multicast session management network element. The communication apparatus may implement a function performed by the multicast session management network element in any one of the seventh aspect or the possible designs of the seventh aspect. The function may be implemented by hardware. In a possible design, the communication apparatus may include a processor and a communication interface. The processor may be configured to support the communication apparatus in implementing the function related to the multicast session management network element in any one of the seventh aspect or the possible designs of the seventh aspect. For example, the processor is configured to: receive, through the communication interface, a sixth message that indicates that a first terminal is joining a multicast group; and if the first terminal is the $1^{st}$ terminal joining the multicast group, send, to the multicast user plane network element, a seventh message that requests to establish a tunnel for transmitting multicast data between the multicast user plane network element and an application server. In another possible design, the communication apparatus may further include a memory. The memory is configured to store computer-executable instructions and data that are necessary for the communication apparatus. When the communication apparatus runs, the processor executes the computer-executable instructions stored in the memory, to enable the communication apparatus to perform the message forwarding method according to any one of the seventh aspect or the possible designs of the seventh aspect.

According to a tenth aspect, a computer-readable storage medium is provided. The computer-readable storage medium stores instructions. When the instructions are run on a computer, the computer is enabled to perform the message forwarding method according to any one of the seventh aspect or the possible designs of the seventh aspect.

According to an eleventh aspect, a computer program product including instructions is provided. When the computer program product runs on a computer, the computer is enabled to perform the message forwarding method according to any one of the seventh aspect or the possible designs of the seventh aspect.

According to a twelfth aspect, a chip system is provided. The chip system includes a processor and a communication interface, and is configured to support a communication apparatus in implementing a function related to the multicast session management network element in any one of the seventh aspect or the possible designs of the seventh aspect. For example, the processor receives, through the communication interface, a sixth message that indicates that a first terminal is joining a multicast group; and if the first terminal is the $1^{st}$ terminal joining the multicast group, sends, to the multicast user plane network element, a seventh message that requests to establish a tunnel for transmitting multicast data between the multicast user plane network element and an application server. In a possible design, the chip system further includes a memory. The memory is configured to store program instructions and data that are necessary for the communication apparatus. The chip system may include a chip, or may include a chip and another discrete component.

For technical effects achieved by any one of the design manners of the ninth aspect to the twelfth aspect, refer to the technical effects achieved by any one of the seventh aspect or the possible designs of the seventh aspect. Details are not described again.

According to a thirteenth aspect, an embodiment of this application further provides a communication system. For example, the communication system may include a unicast user plane network element, a multicast session management network element, the communication apparatus or the chip system according to any one of the second aspect to the sixth aspect, and an application server; or may include a unicast user plane network element, the communication apparatus or the chip system according to any one of the eighth aspect to the twelfth aspect, a multicast user plane network element, and an application server.

BRIEF DESCRIPTION OF DRAWINGS

FIG. 13A and FIG. 13B are a flowchart of another message forwarding method according to an embodiment of this application;

DESCRIPTION OF EMBODIMENTS

The following describes technical solutions in embodiments of this application with reference to the accompanying drawings in embodiments of this application.

Figure 1:
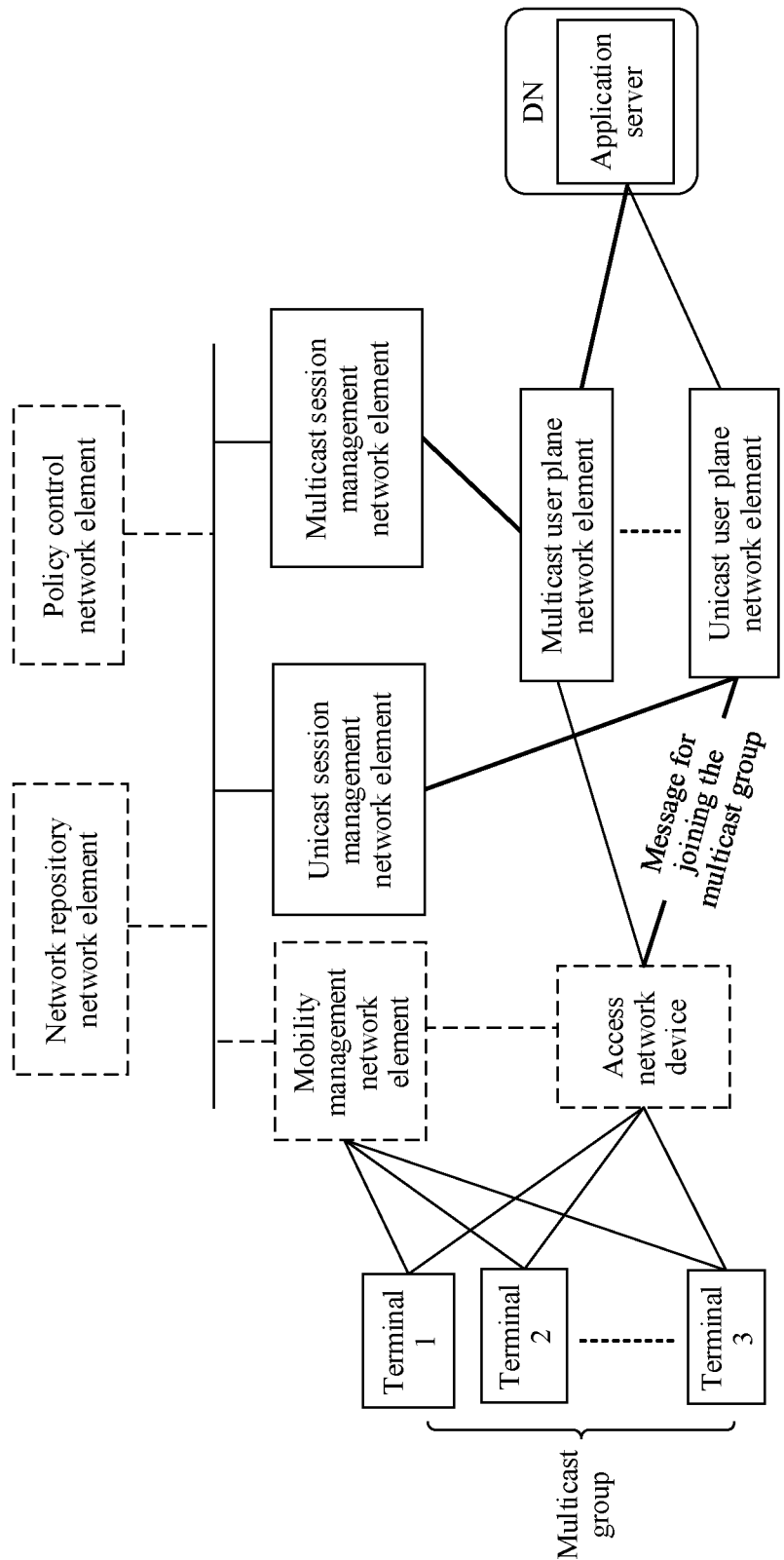
FIG. 1 is a schematic diagram of an architecture of a communication system according to an embodiment of this application.

The message forwarding method provided in embodiments of this application may be applied to a communication system shown in FIG. 1. As shown in FIG. 1, the communication system may include a plurality of terminals, a plurality of user plane network elements, a plurality of session management network elements, and a data network (DN), and may further include an access network device, a mobility management network element, a policy control network element, a network repository network element, and the like. The plurality of terminals may form a multicast group, and the plurality of terminals may simultaneously receive same data, namely, multicast data. The user plane network elements may be classified into a unicast user plane network element and a multicast user plane network element based on types of transmission on the user plane network elements. The unicast user plane network element is configured to transmit unicast data, and the multicast user plane network element may be configured to transmit multicast data. The unicast data may be data sent to a specific terminal or user, and the multicast data may be data sent to a multicast group. The plurality of session management network elements may be classified into a multicast session management network element and a unicast session management network element based on types of user plane network elements managed by the plurality of session management network elements. The unicast session management network element may be a session management network element that manages a unicast user plane network element, and the multicast session management network element may be a session management network element that manages a multicast user plane network element.

The terminal may be referred to as a terminal device (terminal equipment), user equipment (UE), a mobile station (MS), a mobile terminal (MT), or the like. Specifically, the terminal in FIG. 1 may be a mobile phone, a tablet computer, or a computer having a wireless transceiver function, or may be a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in a smart city, a smart home, a vehicle-mounted terminal, or the like.

The access network device is mainly configured to implement functions such as a physical layer function, resource scheduling and management, and access control and mobility management of the terminal. The access network device may be a device supporting wired access, or may be a device supporting wireless access. For example, the access network device may be an access network (AN)/a radio access network (RAN), where the AN/RAN includes a plurality of 5G-AN/5G-RAN nodes. The 5G-AN/5G-RAN node may be an access point (AP), a NodeB (NB), an enhanced NodeB (eNB), a next-generation NodeB (NR NodeB, gNB), a transmission reception point (TRP), a transmission point (TP), another access node, or the like.

The mobility management network element is mainly responsible for access authentication and mobility management of the terminal, signaling exchange between functional network elements, and the like, such as management of a registration status of a user, a connection status of a user, user registration and network access, tracking area update, user authentication during cell handover, and key security.

The session management network element is mainly configured to implement a user plane transmission logical channel, for example, a session management function such as establishment, release, and change of a packet data unit (PDU) session.

The user plane network element may be used as an anchor on the user plane transmission logical channel, and is configured to complete functions such as routing and forwarding of user plane data. For example, the user plane network element establishes a channel (namely, the user plane transmission logical channel) between the user plane network element and the terminal, forwards a data packet between the terminal and the DN on the channel, and is responsible for data packet filtering, data forwarding, rate control, and generation of charging information for the terminal.

The policy control network element may be configured to provide a policy, for example, a quality of service policy or a slice selection policy, for the mobility management network element and the session management network element.

The network repository network element may be configured to store user data such as subscription information and authentication or authorization data of a user. Specifically, the network repository network element may be a unified data management (UDM) network element, a network repository function (NRF), a unified data repository (UDR), or the like.

The DN may be an operator network that provides a data transmission service for a user, for example, may be an operator network that provides an IP multimedia service (IMS) for the user. An application server may be deployed in the DN, and the application server may provide a data transmission service for the user.

The access network device, the mobility management network element, the policy control network element, and the network repository network element in FIG. 1 are optional network elements in this application.

It should be noted that FIG. 1 is merely an example diagram of the architecture. In addition to the functional units shown in FIG. 1, the system may further include another functional network element, for example, an operation and management (O&M) network element. This is not limited in this embodiment of this application. In addition, names of the devices in FIG. 1 are not limited. In addition to the names shown in FIG. 1, the devices may also have other names. For example, the names are replaced with names of network elements having same or similar functions. This is not limited.

Based on the system shown in FIG. 1, embodiments of this application provide a message forwarding method. The method may include: The multicast user plane network element receives, through the multicast session management network element, a message that is sent by the unicast user plane network element and that indicates that a terminal is joining the multicast group; and when the terminal is the 1$^{st}$ terminal joining the multicast group, sends, to the application server, a message that requests to establish a tunnel for transmitting the multicast data between the multicast user plane network element and the application server. Specifically, for the method, refer to descriptions in the following embodiments corresponding to methods shown in FIG. 4 to FIG. 8A and FIG. 8B.

Embodiments of this application provide another message forwarding method. The method may include: The multicast session management network element receives a message that indicates that a terminal is joining the multicast group; and when the terminal is the 1$^{st}$ terminal joining the multicast group, sends, to the multicast user plane network element, a message that requests to establish a tunnel for transmitting the multicast data between the multicast user plane network element and the application server. Specifically, for the method, refer to descriptions in the following embodiments corresponding to methods shown in FIG. 9 to FIG. 13A and FIG. 13B.

Specifically, the communication system shown in FIG. 1 may be a 3rd generation partnership project (3GPP) communication system, for example, a long term evolution (LTE) communication system, a 4th generation (4G) communication system, a 5th generation (5G) communication system, or a new radio (NR) communication system, or may be a non-3GPP communication system. This is not limited.

Figure 2:
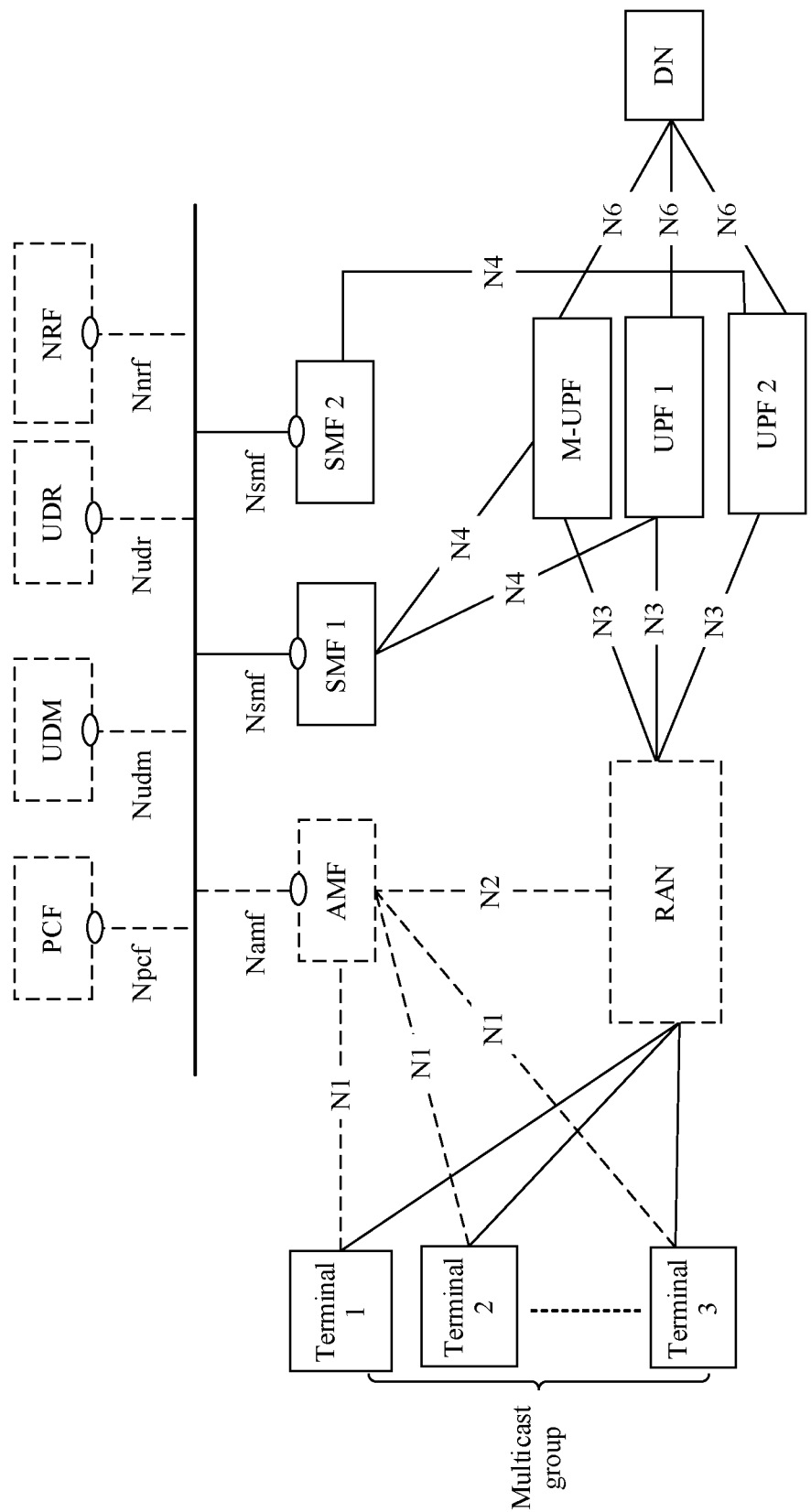
FIG. 2 is a diagram of an architecture of a 5G communication system according to an embodiment of this application.

For example, the communication system shown in FIG. 1 is the 5G communication system. As shown in FIG. 2, a network element or an entity corresponding to the multicast session management network element may be a session management function (M-SMF) in the 5G communication system. A network element or an entity corresponding to the multicast user plane network element may be a user plane function (UPF) in the 5G communication system. A network element or an entity corresponding to the access network device may be a radio access network (RAN) in the 5G communication system. A network element or an entity corresponding to the mobility management network element may be an access and mobility management function (AMF) in the 5G communication system. A network element or an entity corresponding to the policy control network element may be a policy control function (PCF) in the 5G communication system.

As shown in FIG. 2, a terminal communicates with the AMF through a next generation (next generation, N) 1 interface (N1 for short), the RAN communicates with the AMF through an N2 interface (N2 for short), the RAN communicates with the UPF through an N3 interface (N3 for short), and the UPF communicates with the application server in the DN through an N6 interface. Core network elements can communicate with each other through service-oriented interfaces. For example, the AMF can communicate with another core network element through an Namf interface, the SMF can communicate with another core network element through an Nsmf interface, the PCF can communicate with another core network element through an Npcf interface, the UDM can communicate with another core network element through an Nudm interface, the UDR can communicate with another core network element through an Nudr interface, and the NRF can communicate with another core network element through an Nnrf interface.

The RAN, the AMF, the PCF, the UDM, the UDR, and the NRF shown in FIG. 2 are optional network elements in this application, and communication interfaces between these optional network elements and another network element in FIG. 2 are also optional communication interfaces in this application.

Figure 3:
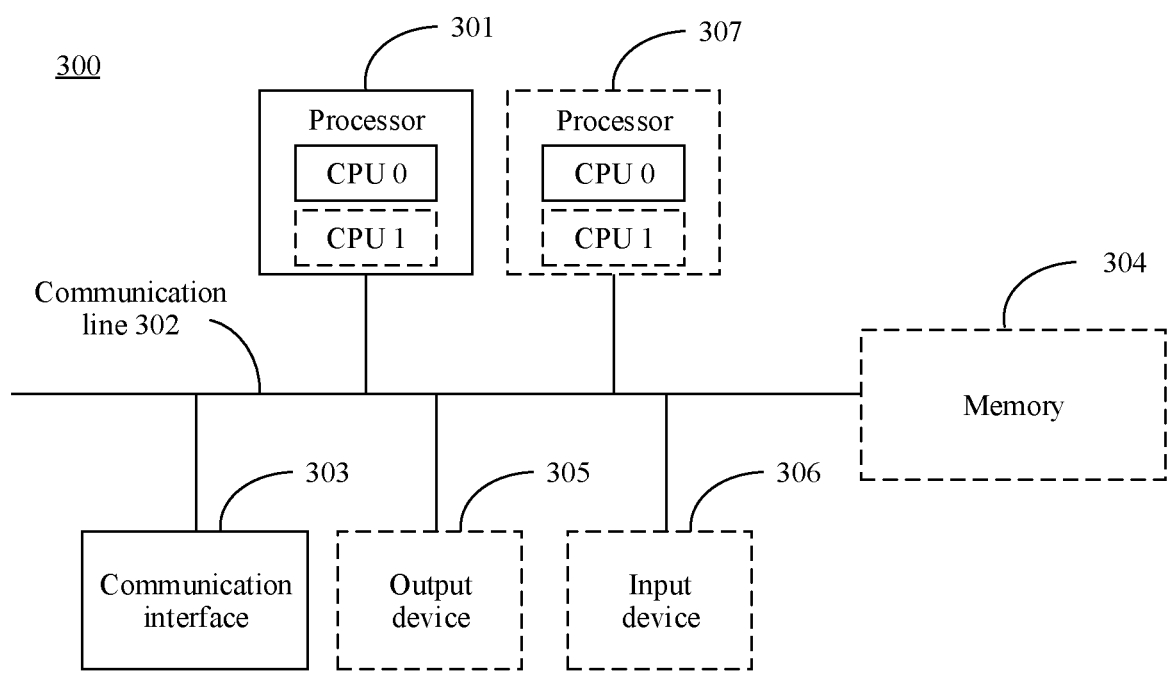
FIG. 3 is a schematic diagram of a hardware structure of a communication apparatus according to an embodiment of this application.

During specific implementation, devices such as the user plane network element and the session management network element in the communication system shown in FIG. 1 each may use a composition structure shown in FIG. 3, or include components shown in FIG. 3. FIG. 3 is a schematic diagram of composition of a communication apparatus 300 according to an embodiment of this application. The communication apparatus 300 may include a processor 301, a communication line 302, and a communication interface 303. Further, the communication apparatus 300 may include a memory 304. The processor 301, the memory 304, and the communication interface 303 may be connected to each other through the communication line 302.

The processor 301 may be a central processing unit (CPU), a general-purpose processor, a network processor (NP), a digital signal processor (DSP), a microprocessor, a microcontroller, a programmable logic device (PLD), or any combination thereof. Alternatively, the processor 301 may be another apparatus having a processing function, for example, a circuit, a component, or a software module. This is not limited.

The communication line 302 is configured to transmit information between the components included in the communication apparatus 300.

The communication interface 303 is configured to communicate with another device or another communication network. The another communication network may be an Ethernet network, a radio access network (RAN), a wireless local area network (WLAN), or the like. The communication interface 303 may be a module, a circuit, a transceiver, or any apparatus that can implement communication.

The memory 304 is configured to store instructions. The instructions may be a computer program.

The memory 304 may be a read-only memory (ROM) or another type of static storage device that can store static information and/or instructions; may be a random access memory (RAM) or another type of dynamic storage device that can store information and/or instructions; or may be an electrically erasable programmable read-only memory (EEPROM), a compact disc read-only memory (compact disc read-only memory, CD-ROM) or another compact disc storage, optical disc storage (including a compressed optical disc, a laser disc, an optical disc, a digital universal optical disc, and a Blu-ray optical disc), magnetic disk storage medium, or another magnetic storage device. This is not limited.

It should be noted that the memory 304 may exist independently of the processor 301, or may be integrated with the processor 301. The memory 304 may be configured to store instructions, program code, some data, or the like. The memory 304 may be located inside the communication apparatus 300, or may be located outside the communication apparatus 300. This is not limited.

The processor 301 is configured to execute the instructions stored in the memory 304, to implement the message forwarding method provided in the following embodiments of this application. For example, when the communication apparatus 300 is a session management network element, or a chip or a system-on-a-chip in the session management network element, the processor 301 executes the instructions stored in the memory 304, to implement steps performed by the session management network element in the following embodiments of this application. For another example, when the communication apparatus 300 is a mobility management network element, or a chip or a system-on-a-chip in the mobility management network element, the processor 301 may execute the instructions stored in the memory 304, to implement steps performed by the mobility management network element in the following embodiments of this application.

In an example, the processor 301 may include one or more CPUs, for example, a CPU 0 and a CPU 1 in FIG. 3.

In an optional implementation, the communication apparatus 300 includes a plurality of processors. For example, in addition to the processor 301 in FIG. 3, the communication apparatus 300 may further include a processor 307.

In an optional implementation, the communication apparatus 300 further includes an output device 305 and an input device 306. For example, the input device 306 is a device such as a keyboard, a mouse, a microphone, or a joystick, and the output device 305 is a device such as a display or a speaker.

It should be noted that the communication apparatus 300 may be a desktop computer, a portable computer, a network server, a mobile phone, a tablet computer, a wireless terminal, an embedded device, a chip system, or a device having a structure similar to that in FIG. 3. In addition, the composition structure shown in FIG. 3 does not constitute a limitation on the communication apparatus. In addition to the components shown in FIG. 3, the communication apparatus may include more or fewer components than those shown in the figure, or some components may be combined, or different component arrangements may be used.

In this embodiment of this application, the chip system may include a chip, or may include a chip and another discrete component.

The following describes a message forwarding method provided in embodiments of this application with reference to the communication system shown in FIG. 1. Network elements in the following embodiments may have components shown in FIG. 3. Details are not described again. It should be noted that actions, terms, and the like in embodiments of this application may be mutually referenced. This is not limited. In embodiments of this application, names of messages exchanged between devices, names of parameters in the messages, or the like are merely examples. Another name may alternatively be used during specific implementation. This is not limited. For example, groupcast in embodiments of this application may be replaced with broadcast, multicast, multicast communication, and multicast/broadcast. Determining in embodiments of this application may also be understood as creating or generating, and "including" in embodiments of this application may also be understood as "carrying". Unified descriptions are provided herein. Details are not specifically limited in embodiments of this application.

Figure 4:
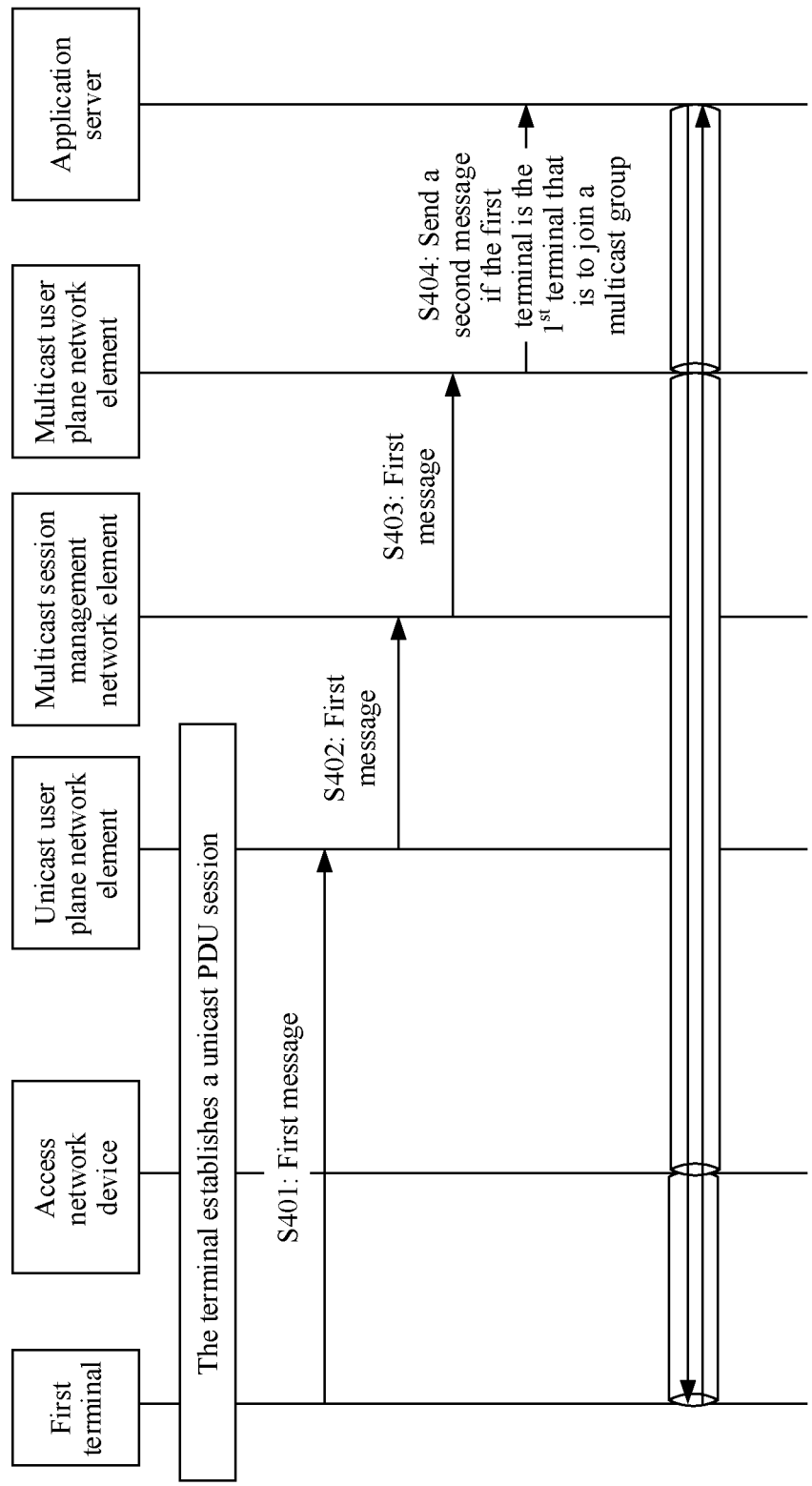
FIG. 4 is a flowchart of a message forwarding method according to an embodiment of this application.

FIG. 4 is a flowchart of a message forwarding method according to an embodiment of this application. The method describes a process in which a unicast user plane network element forwards, to a multicast session management network element, a received message that requests to join a multicast group; the multicast session management network element forwards the received message to a multicast user plane network element; and the multicast user plane network element performs message suppression on the message and then sends the message to an application server. As shown in FIG. 4, the method includes the following steps.

S401: A first terminal sends a first message to the unicast user plane network element.

The first terminal may be any terminal in the multicast group shown in FIG. 1. For example, the first terminal may be a terminal 1 in the multicast group. The multicast group may be a combination of a plurality of terminals that receive same multicast data or a same multicast user service. For example, the multicast group may be a vehicle platoon that receives a command sent by a same command center, or a group that receives a same television program.

The unicast user plane network element corresponds to a unicast PDU session established by the first terminal, and may be an anchor for data transmission between the terminal and the application server. For a manner of establishing the unicast PDU session by the first terminal, refer to a current technology. In a process in which the first terminal establishes the unicast PDU session, a unicast session management network element corresponding to the unicast PDU session may send, to the unicast user plane network element, N4 configuration information that carries a packet detection rule (PDR), and the unicast user plane network element receives the N4 configuration information, and locally stores the PDR. The PDR may be used to detect the multicast data of the multicast group, and may include identification information of the multicast group.

The first message may indicate that the first terminal is joining the multicast group. In other words, the first message indicates that the first terminal requests to receive the multicast data of the multicast group. The first message may be an IGMP message, an MLD message, or another multicast protocol message. This is not limited. For example, the first message may include identification information of the first terminal and the identification information of the multicast group. The identification information of the first terminal may identify the first terminal, and may be an internet protocol (IP) address of the first terminal, a media access control (MAC) address of the first terminal, an international mobile subscriber identity (IMSI) of the first terminal, or the like.

The identification information of the multicast group may identify the multicast group, and may be a temporary mobile group identifier (TMGI) of the multicast group, an internet protocol (IP) address of an application server that provides the multicast user service or the multicast data, or the like.

For example, when the first terminal learns that a user has a requirement for the multicast data, and determines to join the multicast group, the first terminal is triggered to send the first message to the unicast user plane network element.

For example, it is assumed that the multicast data is a television program, for example, a television program on CCTV1 or CCTV2, and the first terminal is a set top box (STB) 1. The STB 1 may display related information of the television program to the user. The user may manually select a desired television program, for example, the user selects CCTV1, and a selection result is sent to the STB 1. The STB 1 sends, to the unicast user plane network element based on the selection result, a first message that carries CCTV1.

For example, the first terminal may send the first message to the unicast user plane network element through the unicast PDU session. In other words, the first terminal may send the first message to the unicast user plane network element through a user plane.

For example, it is assumed that a unicast PDU session established by the terminal 1 in the multicast group is a PDU session 1, and the PDU session 1 corresponds to a UPF 1; and a unicast PDU session established by a terminal 2 in the multicast group is a PDU session 2, and the PDU session 2 corresponds to a UPF 2. In this case, the terminal 1 may send, to the UPF 1 through the PDU session 1, a message for joining the multicast group, and the terminal 2 may send, to the UPF 2 through the PDU session 2, a message for joining the multicast group.

It should be noted that a name of the first message is not limited in embodiments of this application, and the first message may alternatively be named as a multicast/groupcast (multicast/broadcast, MB) join request or another name.

S402: The unicast user plane network element receives the first message, and sends the first message to the multicast session management network element.

For example, after receiving the first message, the unicast user plane network element may search, based on the identification information of the multicast group carried in the first message, for the PDR locally stored in the unicast user plane network element. If the PDR that includes the identification information of the multicast group is found, the unicast user plane network element identifies that the first message is a message that indicates to join the multicast group or a request message that requests to receive the multicast data of the multicast group, and the unicast user plane network element is triggered to send the first message to the multicast session management network element.

The multicast session management network element is a session management network element that manages a multicast service corresponding to the multicast group. In other words, the multicast session management network element is a session management network element that manages the multicast user plane network element, where the multicast user plane network element is an anchor for transmitting the multicast data. The multicast session management network element may be the same as a session management network element corresponding to the PDU session established by the first terminal. The multicast session management network element may manage the unicast user plane network element, and there is a connection relationship between the multicast session management network element and the unicast user plane network element. Alternatively, the multicast session management network element is different from a session management network element corresponding to the PDU session established by the first terminal. The multicast session management network element does not have a function of managing the unicast user plane network element, and there is no connection relationship between the unicast user plane network element and the multicast session management network element.

It should be noted that, in embodiments of this application, a session management network element corresponding to a unicast PDU session may be referred to as a unicast session management network element. This is not limited.

For example, that the unicast user plane network element sends the first message to the multicast session management network element may include the following two cases.

Case 1: The multicast session management network element is the same as the session management network element corresponding to the PDU session established by the first terminal.

That the unicast user plane network element sends the first message to the multicast session management network element may include: The unicast user plane network element sends the first message to the multicast session management network element over an N4 link between the unicast user plane network element and the multicast session management network element.

It should be noted that, in the case 1, unicast PDU sessions established by different terminals may correspond to a same session management network element or different session management network elements. This is not limited.

For example, an SMF 1 and an SMF 2 each have a function of managing the multicast service corresponding to the multicast group, and the SMF 1 and the SMF 2 are different multicast SMFs. It is assumed that the unicast PDU session established by the terminal 1 in the multicast group corresponds to the UPF 1 and the SMF 1, and the unicast PDU session established by the terminal 2 in the multicast group corresponds to the UPF 2 and the SMF 2. In this case, after receiving the message for joining the multicast group sent by the terminal 1, the UPF 1 directly sends the message to the SMF 1. After receiving the message for joining the multicast group sent by the terminal 2, the UPF 2 may also directly send the message to the SMF 2.

Case 2: The multicast session management network element is different from the session management network element corresponding to the PDU session established by the first terminal.

That the unicast user plane network element sends the first message to the multicast session management network element may include: The unicast user plane network element sends the first message to the unicast session management network element. The unicast session management network element receives the first message, selects a multicast session management network element, and sends the first message to the multicast session management network element.

It should be noted that, in the case 2, multicast session management network elements selected by unicast session management network elements corresponding to PDU sessions established by different terminals in the multicast group may be the same, that is, may be a same session management network element. In this case, the different terminals in the multicast group may share the same multicast session management network element. Alternatively, multicast session management network elements selected by unicast session management network elements corresponding to PDU sessions established by different terminals in the multicast group may be different. This is not limited.

For example, the unicast session management network element may select the multicast session management network element by using the following method. The unicast session management network element sends the identification information of the multicast group to a unified data management (UDM) network element, receives identification information of the multicast session management network element from the UDM, and determines, as the session management network element that manages the multicast user plane network element, a multicast session management network element identified by the identification information of the multicast session management network element.

The identification information of the multicast session management network element may identify the multicast session management network element, and may be an internet protocol (IP) address of the multicast session management network element, a media access control (MAC) address of the multicast session management network element, or another identifier that can identify the multicast session management network element. This is not limited.

The UDM may alternatively be replaced with a network repository function (network repository function, NRF), a unified data repository (UDR), a policy control function (PCF), another network element that has a function of selecting the multicast session management network element, or the like. This is not limited. The UDM is used as an example. After receiving the identification information of the multicast group, the UDM may search for a correspondence between the identification information of the multicast group and the identification information of the multicast session management network element, determine the identification information, of the multicast session management network element, corresponding to the identification information of the multicast group sent by the unicast session management network element, and send the identification information of the multicast session management network element to the unicast session management network element. The correspondence between the identification information of the multicast group and the identification information of the multicast session management network element may be preconfigured in the UDM.

S403: The multicast session management network element receives the first message, and sends the first message to the multicast user plane network element.

The multicast user plane network element is the anchor for transmitting the multicast data corresponding to the multicast group. The multicast user plane network element corresponds to a multicast PDU session, and the multicast PDU session may be configured to transmit the multicast data corresponding to the multicast group.

For example, after receiving the first message, the multicast session management network element may select the multicast user plane network element in either of the following two manners, and send the first message to the multicast user plane network element.

Manner 1: The multicast session management network element has established the multicast PDU session, and the multicast PDU session corresponds to the multicast user plane network element. An N4 link has been established between the multicast session management network element and the multicast user plane network element. The multicast session management network element locally stores a correspondence between the identification information of the multicast group and identification information of the multicast user plane network element, where the identification information of the multicast group and the identification information of the multicast user plane network element correspond to the multicast group.

The multicast session management network element may search, by using the identification information of the multicast group as an index, for the locally stored correspondence between the identification information of the multicast group and the identification information of the multicast user plane network element, to obtain the identification information of the multicast user plane network element; and select, as the multicast user plane network element, a user plane network element identified by the identification information of the multicast user plane network element.

In the manner 1, the multicast session management network element may send the first message to the multicast user plane network element over the N4 link between the multicast session management network element and the multicast user plane network element.

For a process in which the multicast session management network element establishes the multicast PDU session, refer to the current technology. In the process in which the multicast session management network element establishes the multicast PDU session, the multicast session management network element may obtain, based on the identification information of the multicast group, the multicast user plane network element that can transmit the multicast data, and locally store the correspondence between the identification information of the multicast group and the identification information of the multicast user plane network element. For a specific process, refer to the current technology. Details are not described again.

Manner 2: The multicast session management network element does not establish the multicast PDU session. The multicast session management network element does not locally find a correspondence between the identification information of the multicast group and identification information of the multicast user plane network element, where the identification information of the multicast group and the identification information of the multicast user plane network element correspond to the multicast group.

In the manner 2, in a possible design, the multicast session management network element sends the identification information of the multicast group to the UDM, receives the identification information of the multicast user plane network element from the UDM, and determines, as the user plane network element corresponding to the multicast PDU session, a multicast user plane network element identified by the identification information of the multicast user plane network element returned by the UDM.

The UDM may alternatively be replaced with an NRF, a UDR, a PCF, another network element that has a function of selecting the multicast user plane network element, or the like. This is not limited. The UDM is used as an example. After receiving the identification information of the multicast group, the UDM may search for the correspondence between the identification information of the multicast group and the identification information of the multicast user plane network element, determine the identification information, of the multicast user plane network element, corresponding to the identification information of the multicast group, and send the identification information of the multicast user plane network element to the unicast session management network element. The correspondence between the identification information of the multicast group and the identification information of the multicast user plane network element may be preconfigured in the UDM. Details are not described again.

In another possible design, when the multicast session management network element is the same as the unicast session management network element corresponding to the unicast PDU session established by the first terminal, and the unicast user plane network element corresponding to the unicast PDU session established by the first terminal has a function of transmitting the multicast data, the multicast session management network element select, as the multicast user plane network element, the unicast user plane network element corresponding to the unicast PDU session established by the first terminal, and sends the first message to the unicast user plane network element.

Further, optionally, in the manner 2, when the multicast session management network element sends the first message to the multicast user plane network element, the multicast session management network element is further triggered to complete a process of establishing a transmission channel, for example, the multicast PDU session, used to transmit the multicast data. That the multicast session management network element establishes the multicast PDU session includes: The multicast session management network element sends a session management policy establishment request (SM policy establishment request) to the PCF; receives, from the PCF, a session management policy establishment response (SM policy establishment response) carrying a policy and charging control (policy and charging control, PCC) rule; sends N4 configuration information to the multicast user plane network element; sends, to an access network device, configuration information used by the access network device to determine an air interface resource for transmitting the multicast data; and so on. In this way, the multicast PDU session is established.

The PCC rule may include an identification rule for identifying a multicast data service data flow (SDF) sent to the multicast group, and packet filter information of the multicast data, and may further include another configuration parameter for transmitting the multicast data, for example, a PDR, a forwarding action rule (FAR) associated with the PDR, a quality of service (QoS) requirement, or a quality of service flow (QF) mapping rule. For related descriptions of these configuration parameters, refer to the current technology. Details are not described again.

The N4 configuration information may be used by the multicast user plane network element to receive the multicast data and send, by using a QF, the multicast data to the access network device. The N4 configuration information may include the packet filter information, the PDR, the FAR associated with the PDR, the QoS requirement, and the QF mapping rule that are of the multicast data, the SDF identification rule, and the like. The N4 configuration information may be an N4 session modification request or an N4 session establishment request.

In this application, to improve resource utilization, the multicast session management network element may further select a QF from a PDU session that is established by the multicast session management network element and whose anchor is the multicast user plane network element, and transmit the multicast data by using the QF, without performing the foregoing process of establishing the multicast PDU session on the new anchor for transmitting the multicast data. A process in which the multicast session management network element selects, from the PDU session established by the multicast session management network element, the QF for transmitting the multicast data may include: The multicast session management network element sends, to the PCF, a session management policy association modification (SM policy association modification) request that requests to update a PCC rule associated with the multicast group; receives, from the PCF, an SM policy association modification response that carries the updated policy and charging control (PCC) rule associated with the multicast group; sends updated N4 configuration information to the multicast user plane network element; and sends, to the access network device, updated configuration information used by the access network device to determine an air interface resource for transmitting the multicast data. In this way, the QF for transmitting the multicast data is established.

In this application, to reduce signaling overheads, that the multicast session management network element sends the first message to the multicast user plane network element may include: The multicast session management network element sends the N4 configuration information/updated N4 configuration information including the first message to the multicast user plane network element.

Further, optionally, in the manner 2, after establishing the multicast PDU session or establishing the QF for transmitting the multicast data, the multicast session management network element locally stores the correspondence between the identification information of the multicast group and the identification information of the multicast user plane network element. The identification information of the multicast group in this application may alternatively be replaced with the SDF identification rule of the multicast data, and the SDF identification rule may identify the multicast data sent to the multicast group. The SDF identification rule may be obtained by the multicast session management network element from the PCF.

It should be noted that, after receiving a message that is initiated by any terminal in the multicast group and that is for joining the multicast group, the multicast session management network element may select a multicast user plane network element in the foregoing manner 1 or manner 2, and multicast user plane network elements selected by the multicast session management network element are a same user plane network element. Details are not described.

S404: The multicast user plane network element receives the first message, and sends a second message to the application server if the first terminal is the $1^{st}$ terminal joining the multicast group.

The second message may request to establish a tunnel for transmitting the multicast data between the multicast user plane network element and the application server. The second message may be an IGMP message, an MLD message, or a PIM message. The second message may include the identification information of the multicast group, the identification information of the multicast user plane network element, other information, and the like. This is not limited.

In an example, the multicast user plane network element may be directly connected to the application server, and the multicast user plane network element may send the second message to the application server through an N6 interface between the multicast user plane network element and the application server.

In this example, the second message may be the PIM message.

In another example, the multicast user plane network element may not be directly connected to the application server, and an intermediate device may exist between the multicast user plane network element and the application server. The multicast user plane network element and the application server may communicate with each other through the intermediate device. For example, the multicast user plane network element may be directly connected to the intermediate device, and the intermediate device may be directly connected to the application server. That the multicast user plane network element sends the second message to the application server may include the following steps.

The multicast user plane network element sends the second message to the intermediate device. The intermediate device receives the second message, and sends, to the application server, a message that requests to establish the tunnel for transmitting the multicast data between the multicast user plane network element and the application server.

The intermediate device may be a device having a forwarding function, for example, a forwarding router at each level.

In the another example, the second message sent by the multicast user plane network element to the intermediate device may be the IGMP message, the MLD message, or the PIM message. When the second message is the IGMP message or the MLD message, the multicast user plane network element may send the second message to the intermediate device; and the intermediate device generates a PIM message based on the IGMP message or the MLD message, and sends the PIM message to the application server. When the second message is the PIM message, the multicast user plane network element sends the second message to the intermediate device; and the intermediate device receives the second message, and forwards the second message to the application server.

In this embodiment of this application, the establishing a tunnel for transmitting the multicast data between the multicast user plane network element and the application server may include: establishing an N6 multicast distribution tree associated with the multicast group in which the application server is used as a data source, and connecting the multicast user plane network element to the N6 multicast distribution tree, where N6 is an interface between the multicast user plane network element and a data network DN, the DN is connected to the application server, and the multicast distribution tree is a forwarding path between a sender and a receiver of the multicast data. It should be noted that naming of the N6 multicast distribution tree is not limited in this application, and the N6 multicast distribution tree may also be referred to as a multicast distribution tree.

For example, before sending the second message to the application server, the multicast user plane network element may further determine whether the first terminal is the $1^{st}$ terminal joining the multicast group. The determining method includes:

when context information of the multicast group does not exist locally in the multicast user plane network element, determining that the first terminal is the $1^{st}$ terminal joining the multicast group;

when context information of the multicast group existing locally in the multicast user plane network element does not include terminal information, determining that the first terminal is the $1^{st}$ terminal joining the multicast group; or when context information of the multicast group exists locally in the multicast user plane network element, and includes terminal information, determining that the first terminal is not the $1^{st}$ terminal joining the multicast group.

The context information of the multicast group corresponds to the multicast group, and may include information associated with the multicast group. For example, the context information of the multicast group may include the identification information of the multicast group, the terminal information, and other information. The terminal information may include identification information of a terminal that has joined the multicast group, a quantity of terminals that have joined the multicast group, and/or the like.

In an initial state, the context information of the multicast group may not exist locally in the multicast user plane network element. After receiving a request sent by the $1^{st}$ terminal that requests to join the multicast group, the multicast user plane network element stores the context information of the multicast group, and sets the quantity of terminals in the context information of the multicast group to 1 and/or stores the identification information of the terminal in the terminal information. Subsequently, each time the multicast user plane network element receives a message that requests to join the multicast group, the multicast user plane network element increases the quantity of terminals by 1, and/or stores, in the terminal information, identification information of a terminal that requests to join the multicast group. Each time the multicast user plane network element receives a message that requests to leave the multicast group, the multicast user plane network element decreases the quantity of terminals by 1, and deletes identification information of a terminal from the terminal information.

Alternatively, the context information of the multicast group exists locally in the multicast user plane network element, but the terminal information in the context information of the multicast group is empty. After receiving the $1^{st}$ message that requests to join the multicast group, the multicast user plane network element adds the terminal information to the context information of the multicast group, and sets the quantity of terminals in the terminal information to 1 and/or includes, in the terminal information, the identification information of the terminal that requests to join the multicast group. Subsequently, each time the multicast user plane network element receives a message that requests to join the multicast group, the multicast user plane network element increases the quantity of terminals by 1, and/or stores, in the terminal information, identification information of a terminal that requests to join the multicast group. Each time the multicast user plane network element receives a message that requests to leave the multicast group, the multicast user plane network element decreases the quantity of terminals by 1, and deletes identification information of a terminal from the terminal information.

According to the method shown in FIG. 4, the unicast user plane network element may send, to the multicast session management network element, the received message that requests to join the multicast group. The multicast session management network element forwards the message to the multicast user plane network element. The multicast user plane network element receives, from the multicast session management network element, the message that indicates that the terminal is joining the multicast group; when the terminal is the $1^{st}$ terminal that requests to join the multicast group, sends the message to the application server, to request the application server to establish the transmission tunnel between the multicast user plane network element and the application server; and sends the multicast data to the terminal in the multicast group through the transmission tunnel. This implements normal forwarding of the multicast data, and provides a solution of forwarding the message for joining the multicast group from the multicast session management network element to the multicast user plane network element and from the multicast user plane network element to the application server. In addition, when the $1^{st}$ terminal initiates a request for joining the multicast group, establishment of the tunnel between the application server and the multicast user plane network element is triggered, and the multicast data is sent, through the tunnel, to the terminal in the multicast group through the multicast user plane network element. There is no need to send, for each terminal that requests to join the multicast group, the message that requests to establish the tunnel between the application server and the multicast user plane network element, so that the signaling overheads are reduced.

It should be noted that the method shown in FIG. 4 is described by using an example in which one terminal requests to join the multicast group. It may be understood that, for other terminals such as a second terminal and a third terminal in the multicast group, messages that are initiated by the terminals and that request to join the multicast group may be forwarded to the multicast user plane network element with reference to the method shown in FIG. 4. Details are not described again.

Further, optionally, in an implementation of the method shown in FIG. 4, to reduce the signaling overheads and avoid repeatedly sending, to the application server, the message that requests to establish the tunnel for transmitting the multicast data between the multicast user plane network element and the application server, a message that requests to join the multicast group may be suppressed. Only when the $1^{st}$ terminal requests to join the multicast group, the user plane network element is triggered to send, to the application server, the message that requests to establish the tunnel for transmitting the multicast data between the multicast user plane network element and the application server. If the message is not initiated by the $1^{st}$ terminal that requests to join the multicast group, sending of the message is suppressed, and the multicast user plane network element is not triggered to send, to the application server, the message that requests to establish the tunnel for transmitting the multicast data between the multicast user plane network element and the application server. In this way, a quantity of times of message sending is reduced, and the signaling overheads are reduced. In this application, the message that requests to join the multicast group may be referred to as a multicast management message, and suppression performed on the message that requests to join the multicast group may be referred to as multicast suppression.

In the method shown in FIG. 4, multicast session management network elements corresponding to the different terminals in the multicast group may be the same or different, and multicast user plane network elements selected by the multicast session management network elements corresponding to the different terminals are a same multicast user plane network element. When the multicast session management network elements corresponding to the different terminals are different, multicast suppression may be completed only by the multicast user plane network element, and the multicast session management network elements corresponding to the different terminals only forward multicast management messages, that is, forward the multicast management messages to the multicast user plane network element. When the multicast session management network elements corresponding to the different terminals are the same, that is, are a same multicast session management network element, multicast suppression may be performed by the multicast user plane network element, or may be performed by the multicast session management network element. This is not limited. For example, multicast suppression is completed by the multicast user plane network element. The process may include the following steps.

The multicast user plane network element receives a third message from the multicast session management network element, where the third message indicates that the second terminal is joining the multicast group, the third message may include identification information of the second terminal and the identification information of the multicast group, and the second terminal is not the $1^{st}$ terminal joining the multicast group.

That the multicast user plane network element sends the second message to the application server includes: The multicast user plane network element sends one second message to the application server. For example, when receiving the message initiated by the $1^{st}$ terminal joining the multicast group, the multicast user plane network element sends the second message to the application server, to trigger establishment of the tunnel for transmitting the multicast data between the multicast user plane network element and the application server. Subsequently, when another terminal such as the second terminal, the third terminal, or a fourth terminal initiates a message for joining the multicast group, the multicast user plane network element suppresses the message initiated by the another terminal, and does not send the second message to the application server.

Based on this implementation, the multicast user plane network element forwards, to the application server, the message that is initiated for the first time and that is for joining the multicast group, and suppresses a message that is not initiated for the first time, so that repeated message sending is avoided, and the signaling overheads are reduced.

For example, it is assumed that the multicast user plane network element is the UPF 1, and the UPF 1 stores context information of a multicast group 1, namely, {multicast group 1, quantity of terminals that join the multicast group 1 being 0}. If the UPF 1 receives the first message, and the first message indicates that the terminal 1 is joining the multicast group 1, the UPF 1 determines, based on the locally stored context information of the multicast group 1, that the terminal 1 is the $1^{st}$ terminal that requests to join the multicast group 1, sends the second message to the application server, and updates the context information of the multicast group 1 to {multicast group 1, quantity of terminals that join the multicast group 1 being 1, terminal 1}. Subsequently, if the UPF 1 receives the third message, and the third message indicates that the terminal 2 is joining the multicast group 1, the UPF 1 determines, based on the locally stored context information of the multicast group 1, that the terminal 2 is the $1^{st}$ terminal that requests to join the multicast group 1. Instead of sending the second message to the application server, the UPF 1 updates the context information of the multicast group 1 to {multicast group 1, quantity of terminals that join the multicast group 1 being 2, terminal 1, terminal 2}.

Further, optionally, in another implementation of the method shown in FIG. 4, the multicast user plane network element may preconfigure an execution rule. The execution rule may be used to trigger the multicast user plane network element to establish the tunnel for transmitting the multicast data between the multicast user plane network element and the application server. The execution rule may include: The multicast user plane network element establishes, with the application server when receiving a multicast protocol message or another type of message that indicates to join the multicast group, the tunnel for transmitting the data. For example, the execution rule may specifically include: establishing the tunnel with the application server when receiving an IGMP message from the multicast session management network element; or establishing the tunnel with the application server when receiving an MLD message from the multicast session management network element.

Correspondingly, when S404 is performed, after receiving the first message whose message format is an IGMP message or an MLD message, the multicast user plane network element may be triggered, according to the execution rule, to determine whether the first message is a message initiated by the $1^{st}$ terminal that requests to join the multicast group, and send the second message to the application server based on a determining result.

Further, optionally, in still another implementation of the method shown in FIG. 4, to improve resource utilization, when no terminal is joining the multicast group, another transmission resource and the tunnel that is for transmitting the multicast data corresponding to the multicast group may be released. Specifically, the method may include the following steps.

The multicast user plane network element receives a fourth message from the multicast session management network element, where the fourth message indicates that the third terminal is leaving the multicast group. If the third terminal is the last terminal that is leaving the multicast group, the multicast user plane network element sends a fifth message to the application server, where the fifth message requests to release the tunnel for transmitting the multicast data.

The third terminal may be the first terminal, the second terminal, or another terminal in the multicast group. This is not limited. The fourth message may include identification information of the third terminal and the identification information of the multicast group.

For example, the multicast user plane network element may search for the locally stored context information of the multicast group by using, as an index, the identification information of the multicast group included in the fourth message. If the quantity of terminals in the context information of the multicast group is 1, and/or the context information of the multicast group includes only the identification information of the third terminal, the multicast user plane network element determines that the third terminal is the last terminal that is leaving the multicast group. Otherwise, the multicast user plane network element determines that the third terminal is not the last terminal that is leaving the multicast group.

Further, optionally, the multicast user plane network element deletes the locally stored context information of the multicast group, or deletes the terminal information included in the locally stored context information of the multicast group.

For example, it is assumed that the multicast user plane network element is the UPF 1, and the UPF 1 stores context information of a multicast group 1, namely, {multicast group 1, quantity of terminals that join the multicast group 1 being 3, terminal 1, terminal 2, terminal 3}. If the UPF 1 receives the fourth message, and the fourth message indicates that the terminal 1 is leaving the multicast group 1, the UPF 1 determines, based on the locally stored context information of the multicast group 1, that the terminal 1 is not the last terminal that is leaving the multicast group 1. Instead of sending the fifth message to the application server, the UPF 1 updates the context information of the multicast group 1 to {multicast group 1, quantity of terminals that join the multicast group 1 being 2, terminal 2, terminal 3}. Subsequently, if the UPF 1 receives the fourth message again, and the fourth message indicates that the terminal 2 is leaving the multicast group 1, the UPF 1 determines, based on the locally stored context information of the multicast group 1, that the terminal 2 is not the last terminal that is leaving the multicast group 1. Instead of sending the fifth message to the application server, the UPF 1 updates the context information of the multicast group 1 to {multicast group 1, quantity of terminals that join the multicast group 1 being 1, terminal 3}. If the UPF 1 receives the fourth message again, and the fourth message indicates that the terminal 3 is leaving the multicast group 1, the UPF 1 determines, based on the locally stored context information of the multicast group 1, that the terminal 3 is the last terminal that is leaving the multicast group 1, sends the fifth message to the application server, and deletes the context information of the multicast group 1, or deletes the terminal information {multicast group 1} included in the context information of the multicast group 1.

Based on this implementation, when no terminal is joining the multicast group, the tunnel for transmitting the multicast data corresponding to the multicast group may be released, so that the resource utilization is improved.

Figure 5:
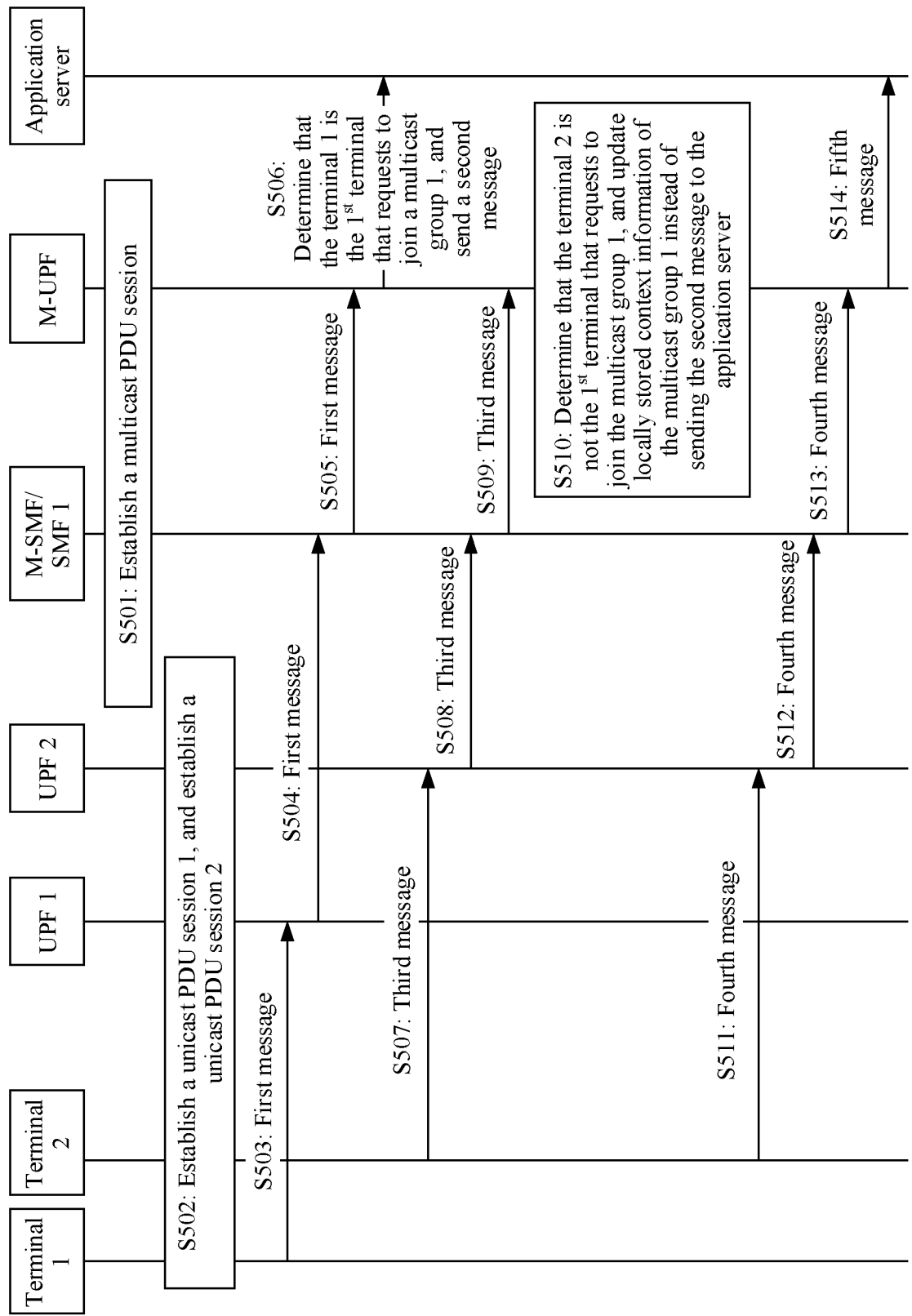
FIG. 5 is a flowchart of a message forwarding method according to an embodiment of this application.

With reference to the 5G communication system shown in FIG. 2, the following uses an example in which the session management network element is an SMF, the user plane network element is a UPF, the multicast session management network element is an M-SMF, the multicast user plane network element is an M-UPF, the terminal 1 and the terminal 2 join the multicast group 1, S402 is performed in the manner described in the foregoing case 1, and the multicast user plane network element is selected in the foregoing manner 1, namely, an example in which session management network elements corresponding to unicast PDU sessions established by the terminals in the multicast group each are an M-SMF, and the M-SMF manages an M-UPF, to describe in detail the method shown in FIG. 4. For the process, refer to the following FIG. 5. It should be noted that, in the method shown in FIG. 5, the M-SMFs corresponding to the unicast PDU sessions established by the different terminals may be a same M-SMF, or may be different M-SMFs. This is not limited. The following method shown in FIG. 5 is described by using an example in which the unicast PDU sessions established by the different terminals in the multicast group correspond to a same M-SMF. For a message forwarding method in a scenario in which the unicast PDU sessions established by the different terminals correspond to different M-SMFs, refer to FIG. 5. Details are not described.

FIG. 5 shows a message forwarding method according to an embodiment of this application. As shown in FIG. 5, the method includes the following steps.

S501: Establish a multicast PDU session.

The multicast PDU session is used to transmit multicast data corresponding to a multicast group 1. In the method shown in FIG. 5, it is assumed that a multicast session management network element corresponding to the multicast PDU session is an SMF 1, and a user plane network element corresponding to the multicast PDU session is an M-UPF. To be specific, the SMF 1 is an M-SMF, manages the M-UPF, and locally stores a correspondence between identification information of the M-UPF and identification information of the multicast group.

Specifically, for a process of establishing the multicast PDU session, refer to the current technology. Details are not described again.

S502: A terminal 1 establishes a unicast PDU session 1, and a terminal 2 establishes a unicast PDU session 2.

The PDU session 1 established by the terminal 1 may be used to transmit data to the terminal 1. In the method shown in FIG. 5, it is assumed that a session management network element corresponding to the PDU session established by the terminal 1 is the SMF 1, a user plane network element corresponding to the PDU session established by the terminal 1 is a UPF 1, and the SMF 1 manages the UPF 1.

The PDU session 2 established by the terminal 2 may be used to transmit data to the terminal 2. In the method shown in FIG. 5, it is assumed that a session management network element corresponding to the PDU session established by the terminal 2 is the SMF 1, a user plane network element corresponding to the PDU session established by the terminal 2 is a UPF 2, and the SMF 1 manages the UPF 2.

Specifically, for a process in which the terminal 1 establishes the unicast PDU session 1 and the terminal 2 establishes the unicast PDU session 2, refer to the current technology. Details are not described again.

It should be noted that an execution sequence of S501 and S502 is not limited in this embodiment of this application. As shown in FIG. 5, S501 may be performed before S502, or S502 may be performed before S501, or S501 and S502 may be performed simultaneously. This is not limited.

S503: The terminal 1 determines to join the multicast group 1, and sends a first message to the UPF 1 through the unicast PDU session 1.

The first message indicates that the terminal 1 is joining the multicast group 1.

Specifically, for S503, refer to descriptions in S401. Details are not described again.

S504: The UPF 1 receives the first message, and sends the first message to the SMF 1.

S505: The SMF 1 receives the first message, selects the M-UPF, and sends the first message to the M-UPF.

For a manner in which the SMF 1 selects the M-UPF, refer to descriptions in the manner 1 in FIG. 4. Details are not described again.

S506: The M-UPF receives the first message; does not locally find context information of the multicast group 1; determines that the terminal 1 is the $1^{st}$ terminal that requests to join the multicast group 1; sends a second message to an application server, to request the application server to establish a tunnel for transmitting the multicast data between the application server and the M-UPF; and locally stores the context information of the multicast group 1.

The context information of the multicast group 1 may include {multicast group 1, quantity of terminals that join the multicast group 1 being 1, terminal 1}.

S507: The terminal 2 determines to join the multicast group 1, and sends a third message to the UPF 2 through the unicast PDU session 2.

The third message indicates that the terminal 2 is joining the multicast group 1.

Specifically, for S507, refer to descriptions in S401. Details are not described again.

S508: The UPF 2 receives the third message, and sends the third message to the SMF 1.

S509: The SMF 1 receives the third message, selects the M-UPF, and sends the third message to the M-UPF.

For a manner in which the SMF 1 selects the M-UPF, refer to descriptions in the manner 1 in FIG. 4. Details are not described again.

S510: The M-UPF receives the third message; locally finds the context information of the multicast group 1; determines that the terminal 2 is not the $1^{st}$ terminal that requests to join the multicast group 1; and updates the locally stored context information of the multicast group 1 instead of sending the second message to the application server.

The updated context information of the multicast group 1 may include {multicast group 1, quantity of terminals that join the multicast group 1 being 2, terminal 1, terminal 2}.

Similarly, for a process in which another terminal in the multicast group 1 requests to join the multicast group 1, refer to descriptions in S507 to S510. Details are not described again.

Correspondingly, as a process corresponding to a process in which a terminal is joining the multicast group 1, a process in which a terminal is leaving the multicast group 1 is further included in the method shown in FIG. 5. For example, the terminal 1 determines to leave the multicast group 1, and sends, to the UPF 1 through the unicast PDU session 1, a message that indicates that the terminal 1 is leaving the multicast group 1. The UPF 1 receives the message, and forwards the message to the SMF 1. The SMF 1 receives the message, selects the M-UPF, and sends the message to the M-UPF. The UPF 1 receives the message; locally searches for the context information of the multicast group 1, namely, {multicast group 1, quantity of terminals that join the multicast group 1 being 2, terminal 1, terminal 2}; determines, based on the context information of the multicast group 1, that the terminal 1 is not the last terminal that requests to leave the multicast group 1; and updates the context information of the multicast group 1, decreases the quantity of terminals by 1, and deletes the terminal 1 from terminal information. The updated context information of the multicast group 1 may include {multicast group 1, quantity of terminals that join the multicast group 1 being 1, terminal 2}.

Similarly, for a process in which another terminal in the multicast group 1 requests to leave the multicast group 1, refer to the foregoing process. Details are not described again. When the last terminal is leaving the multicast group 1, to improve resource utilization, the tunnel for transmitting the multicast data needs to be released. The following uses an example in which the terminal 2 is the last terminal that is leaving the multicast group 1 for description. As shown in FIG. 5, the method may further include the following steps.

S511: The terminal 2 determines to leave the multicast group 1, and sends a fourth message to the UPF 2 through the unicast PDU session 2.

The fourth message may indicate that the terminal 2 is leaving the multicast group 1.

S512: The UPF 2 receives the fourth message, and sends the fourth message to the SMF 1.

S513: The SMF 1 receives the fourth message, selects the M-UPF, and sends the fourth message to the M-UPF.

For a manner in which the SMF 1 selects the M-UPF, refer to descriptions in the manner 1 in FIG. 4. Details are not described again.

S514: The M-UPF receives the fourth message; locally searches for the context information of the multicast group 1, namely, {multicast group 1, quantity of terminals that join the multicast group 1 being 1, terminal 2}; determines, based on the context information of the multicast group 1, that the terminal 2 is the last terminal that requests to leave the multicast group 1; sends a fifth message to the application server; and deletes the context information of the multicast group 1, or deletes the terminal information included in the context information of the multicast group 1.

The fifth message may request to release the tunnel for transmitting the multicast data.

Figure 6:
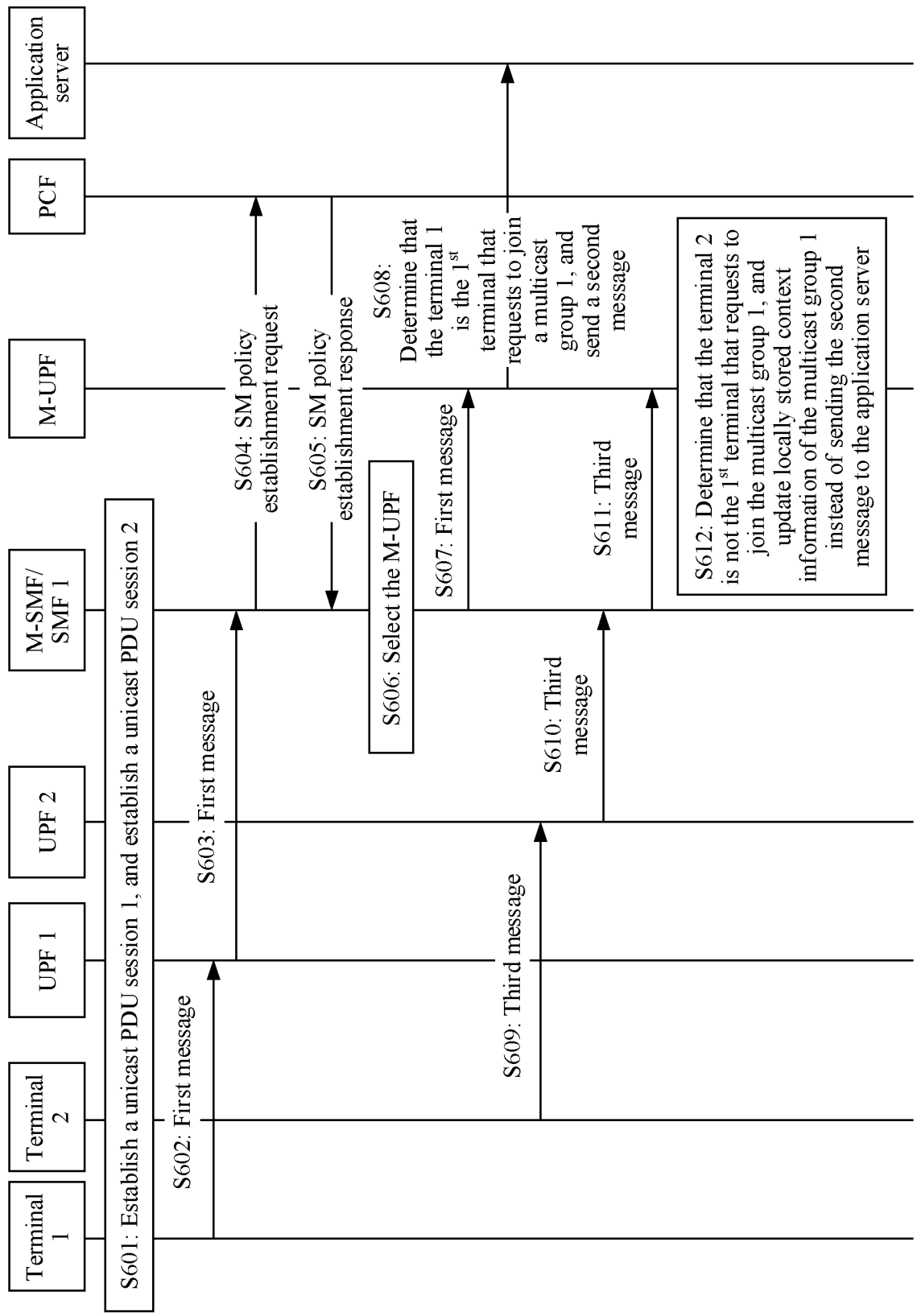
FIG. 6 is a flowchart of a message forwarding method according to an embodiment of this application.

With reference to the 5G communication system shown in FIG. 2, the following uses an example in which the session management network element is an SMF, the user plane network element is a UPF, the multicast session management network element is an M-SMF, the multicast user plane network element is an M-UPF, the terminal 1 and the terminal 2 join the multicast group 1, S402 is performed in the manner described in the foregoing case 1, and the multicast user plane network element is selected in the foregoing manner 2, namely, an example in which session management network elements corresponding to unicast PDU sessions established by the different terminals in the multicast group each are an M-SMF, and the M-SMF manages an M-UPF, to describe in detail the method shown in FIG. 4. For the process, refer to the following FIG. 6. It should be noted that, in the method shown in FIG. 6, the M-SMFs corresponding to the unicast PDU sessions established by the different terminals may be a same M-SMF, or may be different M-SMFs. This is not limited. The following method shown in FIG. 6 is described by using an example in which the unicast PDU sessions established by the different terminals in the multicast group correspond to a same M-SMF. For a message forwarding method in a scenario in which the unicast PDU sessions established by the different terminals correspond to different M-SMFs, refer to FIG. 6. Details are not described.

FIG. 6 shows a message forwarding method according to an embodiment of this application. As shown in FIG. 6, the method includes the following steps.

S601: A terminal 1 establishes a unicast PDU session 1, and a terminal 2 establishes a unicast PDU session 2.

S601 is the same as S502. Details are not described again.

S602: The terminal 1 determines to join a multicast group 1, and sends a first message to a UPF 1 through the unicast PDU session 1.

Related descriptions of the first message and an execution process of S602 are the same as those in S503. Details are not described again.

S603: The UPF 1 receives the first message, and sends the first message to an SMF 1.

S604: The SMF 1 receives the first message; and if the SMF 1 does not find a correspondence between identification information of the multicast group and identification information of an M-UPF, determines to establish a multicast PDU session for the multicast group 1, and sends an SM policy establishment request to a PCF.

The correspondence between the identification information of the multicast group and the identification information of the M-UPF may be stored by the M-SMF in the M-SMF or another network element such as the PCF or a UDR after the M-SMF successfully establishes, for the first time, the multicast PDU session for transmitting multicast data corresponding to the multicast group. This is not limited.

The SM policy establishment request may request the PCF to allocate a PCC rule to the multicast group.

S605: The PCF receives the SM policy establishment request, and sends an SM policy establishment response to the SMF 1.

The SM policy establishment response may include the PCC rule. The PCC rule may include information such as packet filter information of the multicast data corresponding to the multicast group, and an SDF identification rule, a PDR, an FAR associated with the PDR, a QoS requirement, and a QF mapping rule that are of the multicast data.

It should be noted that, alternatively, in S604, the SMF 1 may determine, for the multicast group 1, a QF in a PDU session established by the SMF 1, and the QF may be used to transmit the multicast data corresponding to the multicast group. If the SMF 1 determines to establish the QF for the multicast group 1 in S604, the SM policy establishment request may be replaced with an SM policy association modification request, and the SM policy association modification request may request the PCF to update the PCC rule associated with the multicast group. The SM policy establishment response may be replaced with an SM policy association modification response, and the SM policy association modification response may include the updated PCC rule. The updated PCC rule may include information such as the packet filter information of the multicast data, and the PDR, the FAR associated with the PDR, and the SDF identification rule that are of the multicast data.

S606: The SMF 1 receives the SM policy establishment response, and selects the M-UPF.

For a process in which the SMF 1 selects the M-UPF, refer to descriptions in the foregoing manner 2. Details are not described again.

Further, optionally, the SMF 1 stores the correspondence between the identification information of the M-UPF and the identification information of the multicast group.

S607: The SMF 1 sends the first message to the M-UPF.

S608: The M-UPF receives the first message; does not locally find context information of the multicast group 1; determines that the terminal 1 is the $1^{st}$ terminal that requests to join the multicast group 1; sends a second message to an application server, to request the application server to establish a tunnel for transmitting the multicast data between the application server and the M-UPF; and locally stores the context information of the multicast group 1.

The context information of the multicast group 1 may include {multicast group 1, quantity of terminals that join the multicast group 1 being 1, terminal 1}.

S609: The terminal 2 determines to join the multicast group 1, and sends a third message to a UPF 2 through the unicast PDU session 2.

The third message indicates that the terminal 2 is joining the multicast group 1.

Specifically, for S609, refer to descriptions in S401. Details are not described again.

S610: The UPF 2 receives the third message, and sends the third message to the SMF 1.

S611: The SMF 1 receives the third message, selects the M-UPF based on the correspondence between the identification information of the M-UPF and the identification information of the multicast group, and sends the third message to the M-UPF.

S612: The M-UPF receives the third message; locally finds the context information of the multicast group 1; determines that the terminal 2 is not the $1^{st}$ terminal that requests to join the multicast group 1; and updates the locally stored context information of the multicast group 1 instead of sending the second message to the application server.

The updated context information of the multicast group 1 may include {multicast group 1, quantity of terminals that join the multicast group 1 being 2, terminal 1, terminal 2}.

Similarly, for a process in which another terminal in the multicast group 1 requests to join the multicast group 1, refer to descriptions in S609 to S612. Details are not described again.

Correspondingly, as a process corresponding to a process in which a terminal is joining the multicast group 1, a process in which a terminal is leaving the multicast group 1 is further included in the method shown in FIG. 6. For the specific process, refer to the process in which a terminal is leaving the multicast group 1 shown in FIG. 5. Details are not described again.

Figure 7:
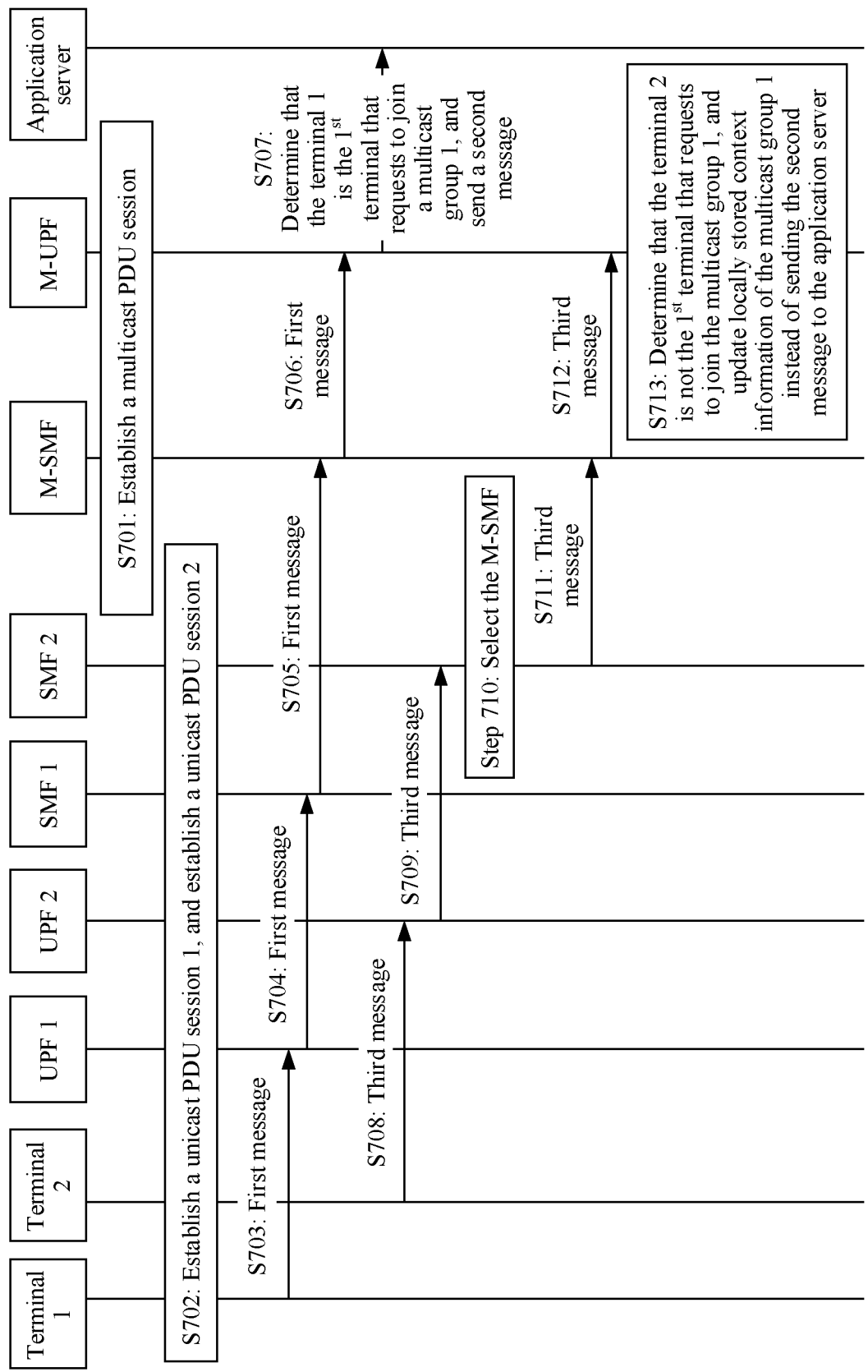
FIG. 7 is a flowchart of a message forwarding method according to an embodiment of this application.

With reference to the 5G communication system shown in FIG. 2, the following uses an example in which the access network device is a RAN, the mobility management network element is an AMF, the session management network element is an SMF, the user plane network element is a UPF, the multicast session management network element is an M-SMF, the multicast user plane network element is an M-UPF, the terminal 1 and the terminal 2 join the multicast group 1, S402 is performed in the manner described in the foregoing case 2, and the multicast user plane network element is selected in the foregoing manner 1, namely, an example in which neither of session management network elements corresponding to unicast PDU sessions established by the terminals in the multicast group are an M-SMF, and the M-SMF has established a multicast PDU session, to describe in detail the method shown in FIG. 4. For the process, refer to the following FIG. 7. It should be noted that, in the method shown in FIG. 7, M-SMFs selected by unicast SMFs corresponding to different unicast PDU sessions may be a same M-SMF, or may be different M-SMFs. This is not limited. The following method shown in FIG. 7 is described by using an example in which the unicast SMFs corresponding to the unicast PDU sessions established by the different terminals in the multicast group select a same M-SMF. For a message forwarding method in a scenario in which the unicast SMFs corresponding to the unicast PDU sessions established by the different terminals select different M-SMFs, refer to FIG. 7. Details are not described.

FIG. 7 shows a message forwarding method according to an embodiment of this application. As shown in FIG. 7, the method includes the following steps.

S701: Establish a multicast PDU session.

The multicast PDU session is used to transmit multicast data corresponding to a multicast group 1. In the method shown in FIG. 7, it is assumed that a session management network element corresponding to the multicast PDU session is an M-SMF, a user plane network element corresponding to the multicast PDU session is an M-UPF, and the M-SMF manages the M-UPF, and locally stores a correspondence between identification information of the M-UPF and identification information of the multicast group.

Specifically, for a process of establishing the multicast PDU session, refer to the current technology. Details are not described again.

S702: A terminal 1 establishes a unicast PDU session 1, and a terminal 2 establishes a unicast PDU session 2.

The PDU session 1 established by the terminal 1 may be used to transmit data to the terminal 1. In the method shown in FIG. 7, it is assumed that a session management network element corresponding to the PDU session established by the terminal 1 is an SMF 1, a user plane network element corresponding to the PDU session established by the terminal 1 is a UPF 1, and the SMF 1 manages the UPF 1.

The PDU session 2 established by the terminal 2 may be used to transmit data to the terminal 2. In the method shown in FIG. 7, it is assumed that a session management network element corresponding to the PDU session established by the terminal 2 is an SMF 2, a user plane network element corresponding to the PDU session established by the terminal 2 is a UPF 2, and the SMF 2 manages the UPF 2.

Specifically, for a process in which the terminal 1 establishes the unicast PDU session 1 and the terminal 2 establishes the unicast PDU session 2, refer to the current technology. Details are not described again.

It should be noted that an execution sequence of S701 and S702 is not limited in this embodiment of this application. As shown in FIG. 7, S701 may be performed before S702, or S702 may be performed before S701, or S701 and S702 may be performed simultaneously. This is not limited.

S703: The terminal 1 determines to join the multicast group 1, and sends a first message to the UPF 1 through the unicast PDU session 1.

Related descriptions of the first message and an execution process of S703 are the same as those in S503. Details are not described again.

S704: The UPF 1 receives the first message, and sends the first message to the SMF 1.

S705: The SMF 1 receives the first message, selects the M-SMF, and sends the first message to the M-SMF.

For a process in which the SMF 1 selects the M-SMF, refer to descriptions in the case 2 in S402. Details are not described again.

S706: The M-SMF receives the first message, and sends the first message to the M-UPF based on the locally stored correspondence between the identification information of the M-UPF and the identification information of the multicast group.

S707: The M-UPF receives the first message; does not locally find context information of the multicast group 1; determines that the terminal 1 is the 1$^{st}$ terminal that requests to join the multicast group 1; sends a second message to an application server, to request the application server to establish a tunnel for transmitting the multicast data between the application server and the M-UPF; and locally stores the context information of the multicast group 1.

The context information of the multicast group 1 may include {multicast group 1, quantity of terminals that join the multicast group 1 being 1, terminal 1}.

S708: The terminal 2 determines to join the multicast group 1, and sends a third message to the UPF 2 through the unicast PDU session 2.

The third message indicates that the terminal 2 is joining the multicast group 1.

Specifically, for S708, refer to descriptions in an implementation in FIG. 4. Details are not described again.

S709: The UPF 2 receives the third message, and sends the third message to the SMF 2.

S710: The SMF 2 receives the third message, and selects the M-SMF.

For a process in which the SMF 2 selects the M-SMF, refer to descriptions in the case 2 in S402. Details are not described again.

S711: The SMF 2 sends the third message to the M-SMF.

S712: The M-SMF receives the third message, and sends the third message to the M-UPF based on the locally stored correspondence between the identification information of the M-UPF and the identification information of the multicast group.

S713: The M-UPF receives the third message; locally finds the context information of the multicast group 1; determines that the terminal 2 is not the 1$^{st}$ terminal that requests to join the multicast group 1; and updates the locally stored context information of the multicast group 1 instead of sending the second message to the application server.

The updated context information of the multicast group 1 may include {multicast group 1, quantity of terminals that join the multicast group 1 being 2, terminal 1, terminal 2}.

Similarly, for a process in which another terminal in the multicast group 1 requests to join the multicast group 1, refer to descriptions in S708 to S713. Details are not described again.

Correspondingly, as a process corresponding to a process in which a terminal is joining the multicast group 1, a process in which a terminal is leaving the multicast group 1 is further included in the method shown in FIG. 7. For the specific process, refer to the process in which a terminal is leaving the multicast group 1 shown in FIG. 5. Details are not described again.

Figure 8A:
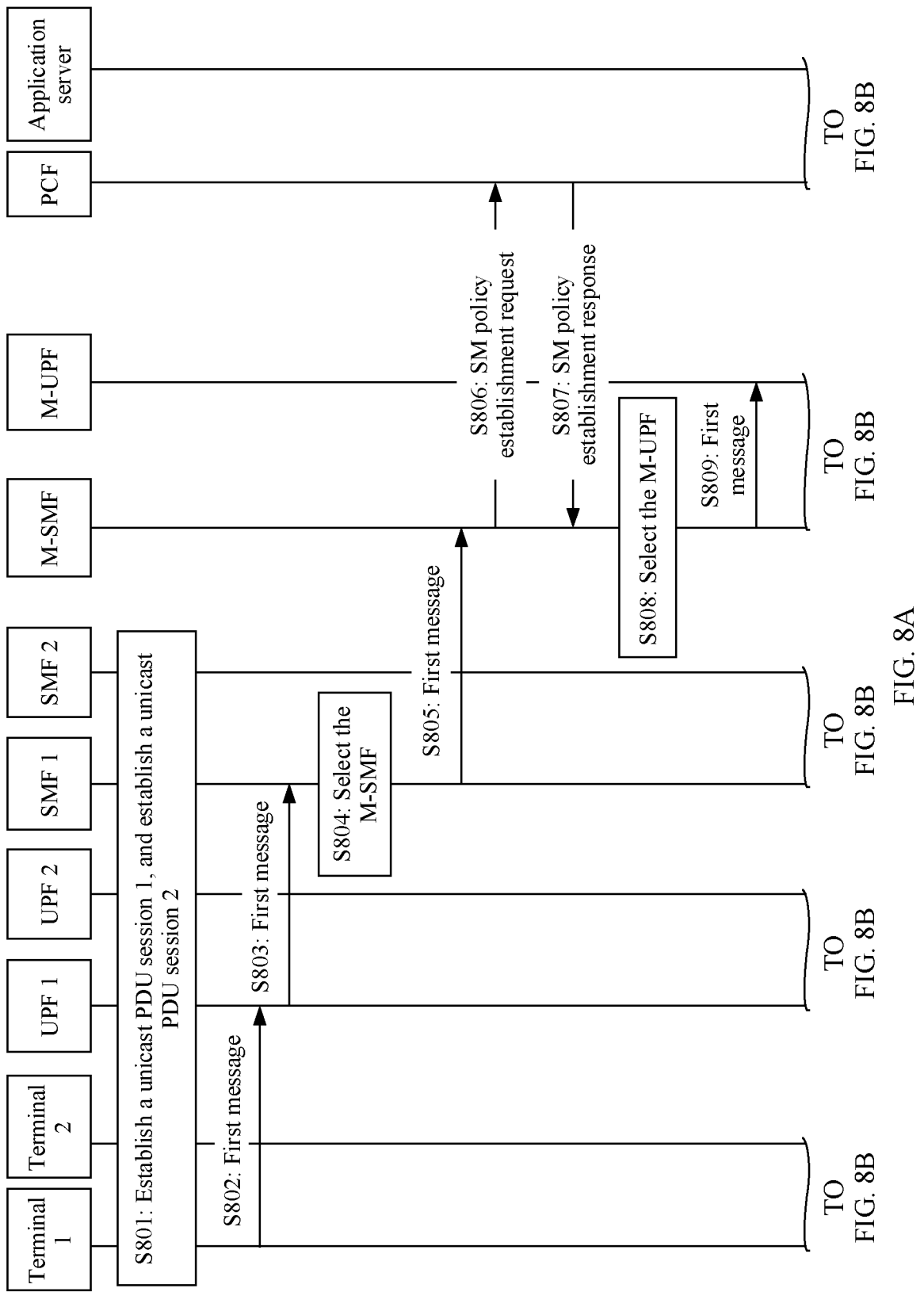
FIG. 8A and FIG. 8B are a flowchart of a message forwarding method according to an embodiment of this application.
Figure 8B:
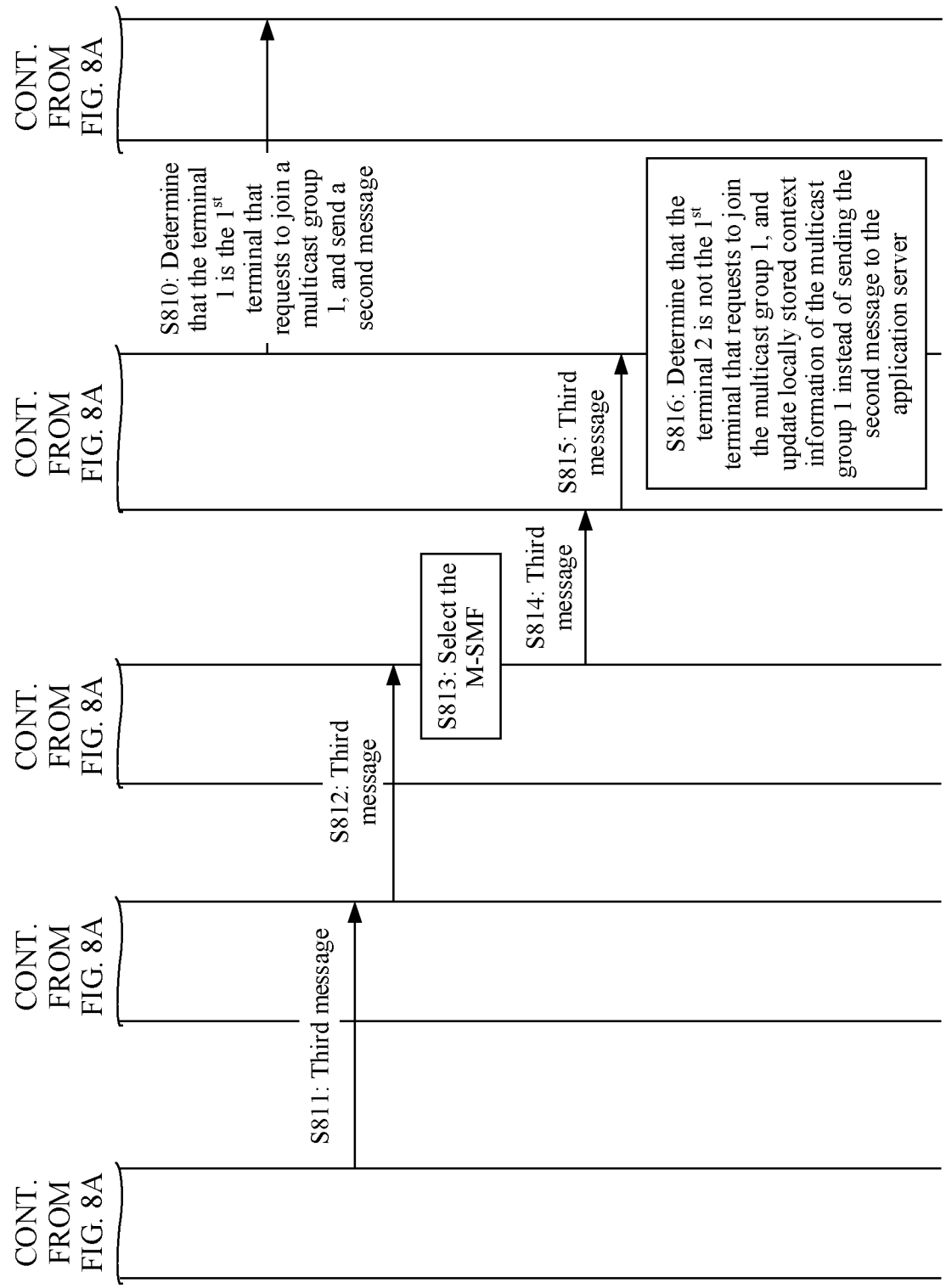

With reference to the 5G communication system shown in FIG. 2, the following uses an example in which the access network device is a RAN, the mobility management network element is an AMF, the session management network element is an SMF, the user plane network element is a UPF, the multicast session management network element is an M-SMF, the multicast user plane network element is an M-UPF, the terminal 1 and the terminal 2 join the multicast group 1, S402 is performed in the manner described in the foregoing case 2, and the multicast user plane network element is selected in the foregoing manner 2, namely, an example in which neither of session management network elements corresponding to unicast PDU sessions established by the terminals in the multicast group are an M-SMF, and the M-SMF does not establish a multicast PDU session, to describe in detail the method shown in FIG. 4. For the process, refer to the following FIG. 8A and FIG. 8B. It should be noted that, in the method shown in FIG. 8A and FIG. 8B, M-SMFs selected by unicast SMFs corresponding to different unicast PDU sessions may be a same M-SMF, or may be different M-SMFs. This is not limited. The following method shown in FIG. 8A and FIG. 8B is described by using an example in which the unicast SMFs corresponding to the unicast PDU sessions established by the different terminals in the multicast group select a same M-SMF. For a message forwarding method in a scenario in which the unicast SMFs corresponding to the unicast PDU sessions established by the different terminals select different M-SMFs, refer to FIG. 8A and FIG. 8B. Details are not described.

FIG. 8A and FIG. 8B show a message forwarding method according to an embodiment of this application. As shown in FIG. 8A and FIG. 8B, the method includes the following steps.

S801: A terminal 1 establishes a unicast PDU session 1, and a terminal 2 establishes a unicast PDU session 2.

The PDU session 1 established by the terminal 1 may be used to transmit data to the terminal 1. In the method shown in FIG. 7, it is assumed that a session management network element corresponding to the PDU session established by the terminal 1 is an SMF 1, a user plane network element corresponding to the PDU session established by the terminal 1 is a UPF 1, and the SMF 1 manages the UPF 1.

The PDU session 2 established by the terminal 2 may be used to transmit data to the terminal 2. In the method shown in FIG. 7, it is assumed that a session management network element corresponding to the PDU session established by the terminal 2 is an SMF 2, a user plane network element corresponding to the PDU session established by the terminal 2 is a UPF 2, and the SMF 2 manages the UPF 2.

Specifically, for a process in which the terminal 1 establishes the unicast PDU session 1 and the terminal 2 establishes the unicast PDU session 2, refer to the current technology. Details are not described again.

S802: The terminal 1 determines to join a multicast group 1, and sends a first message to the UPF 1 through the unicast PDU session 1.

Related descriptions of the first message and an execution process of S802 are the same as those in S401. Details are not described again.

S803: The UPF 1 receives the first message, and sends the first message to the SMF 1.

S804: The SMF 1 receives the first message, and selects an M-SMF.

For a process in which the SMF 1 selects the M-SMF, refer to descriptions in the case 2 in S402. Details are not described again.

S805: The SMF 1 sends the first message to the M-SMF.

S806: The M-SMF receives the first message; does not locally find a correspondence between identification information of an M-UPF and identification information of the multicast group; determines to establish a multicast PDU session for the multicast group 1; and sends an SM policy establishment request to a PCF.

S806 is the same as S604. Details are not described again.

S807: The PCF receives the SM policy establishment request, and sends an SM policy establishment response to the M-SMF.

S807 is the same as S605. Details are not described again.

S808: The M-SMF receives the SM policy establishment response, and selects the M-UPF.

For a process in which the M-SMF selects the M-UPF, refer to descriptions in the manner 2 in the method shown in FIG. 4. Details are not described again.

Further, optionally, the M-SMF stores the correspondence between the identification information of the M-UPF and the identification information of the multicast group.

S809: The M-SMF sends the first message to the M-SMF.

S810: The M-UPF receives the first message; does not locally find context information of the multicast group 1; determines that the terminal 1 is the $1^{st}$ terminal that requests to join the multicast group 1; sends a second message to an application server, to request the application server to establish a tunnel for transmitting the multicast data between the application server and the M-UPF; and locally stores the context information of the multicast group 1.

The context information of the multicast group 1 may include {multicast group 1, quantity of terminals that join the multicast group 1 being 1, terminal 1}.

S811: The terminal 2 determines to join the multicast group 1, and sends a third message to the UPF 2 through the unicast PDU session 2.

The third message indicates that the terminal 2 is joining the multicast group 1.

Specifically, for S811, refer to descriptions in an implementation in FIG. 4. Details are not described again.

S812: The UPF 2 receives the third message, and sends the third message to the SMF 2.

S813: The SMF 2 receives the third message, and selects the M-SMF.

For a process in which the SMF 2 selects the M-SMF, refer to descriptions in the case 2 in S402. Details are not described again.

S814: The SMF 2 sends the third message to the M-SMF.

S815: The M-SMF receives the third message, and sends the third message to the M-UPF based on the locally stored correspondence between the identification information of the M-UPF and the identification information of the multicast group.

S816: The M-UPF receives the third message; locally finds the context information of the multicast group 1; determines that the terminal 2 is not the $1^{st}$ terminal that requests to join the multicast group 1; and updates the locally stored context information of the multicast group 1 instead of sending the second message to the application server.

The updated context information of the multicast group 1 may include {multicast group 1, quantity of terminals that join the multicast group 1 being 2, terminal 1, terminal 2}.

Similarly, for a process in which another terminal in the multicast group 1 requests to join the multicast group 1, refer to descriptions in S811 to S816. Details are not described again.

Correspondingly, as a process corresponding to a process in which a terminal is joining the multicast group 1, a process in which a terminal is leaving the multicast group 1 is further included in the method shown in FIG. 8A and FIG. 8B. For the specific process, refer to the process in which a terminal is leaving the multicast group 1 shown in FIG. 5. Details are not described again.

Figure 9:
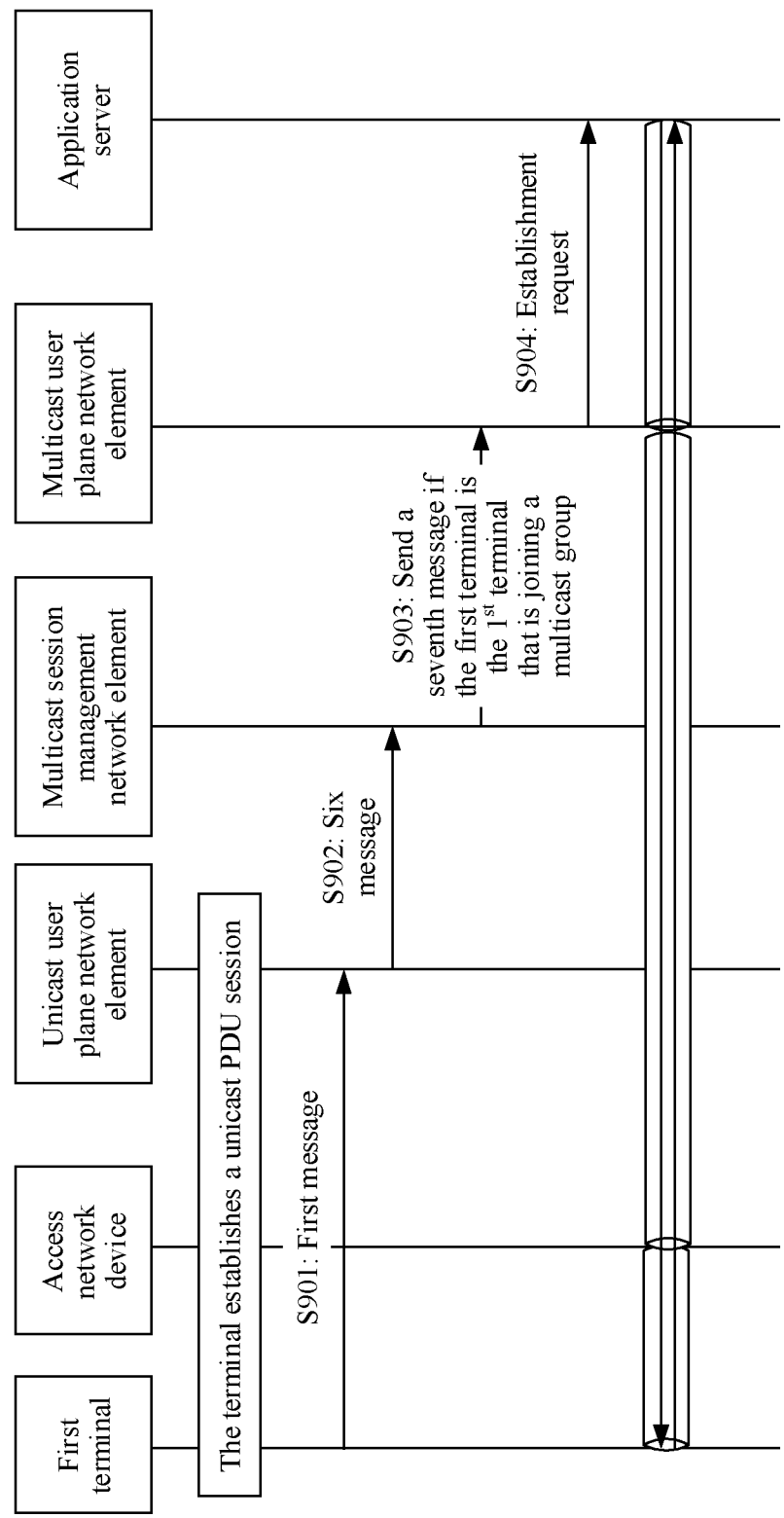
FIG. 9 is a flowchart of another message forwarding method according to an embodiment of this application.

The methods shown in FIG. 4 to FIG. 8A and FIG. 8B are described by using an example in which the multicast user plane network element suppresses a message that requests to join/leave the multicast group. Alternatively, when the different terminals in the multicast group share a same multicast session management network element, for example, the unicast session management network elements corresponding to the unicast PDU sessions established by the different terminals in the multicast group select a same multicast session management network element, the multicast session management network element may suppress a message that requests to join/leave the multicast group. Specifically, for the process, refer to the following FIG. 9 to FIG. 13A and FIG. 13B. FIG. 9 is a flowchart of another message forwarding method according to an embodiment of this application. As shown in FIG. 9, the method may include the following steps.

S901: A first terminal sends a first message to a unicast user plane network element.

S901 is the same as S401. Details are not described again.

S902: The unicast user plane network element receives the first message, and sends a sixth message to a multicast session management network element.

The sixth message may indicate that the first terminal is joining a multicast group. The sixth message may be the same as or different from the first message. This is not limited.

For example, for a process in which the unicast user plane network element sends the sixth message to the multicast session management network element, refer to the process in which the unicast user plane network element sends the first message to the multicast session management network element shown in the case 1 or the case 2 in S402. For example, in a possible implementation, the unicast user plane network element sends the sixth message to the multicast session management network element over an N4 link between the unicast user plane network element and the multicast session management network element. In this implementation, the sixth message may be the same as or different from the first message. For example, the sixth message may be an IGMP message, an MLD message, or a user plane event notification message.

In another possible implementation, the unicast user plane network element sends the first message or a user plane event notification message to a unicast session management network element over an N4 link between the unicast user plane network element and the unicast session management network element. The unicast session management network element selects the multicast session management network element, and sends the sixth message to the multicast session management network element. In this possible implementation, the sixth message may be an IGMP message, an MLD message, or a control plane message. This is not limited.

Specifically, for a detailed sending process, refer to descriptions in S402. Details are not described again.

S903: The multicast session management network element receives the sixth message, and sends a seventh message to a multicast user plane network element if the first terminal is the $1^{st}$ terminal joining the multicast group.

The seventh message may request to establish a tunnel for transmitting multicast data between the multicast user plane network element and an application server. The seventh message may be an IGMP message, an MLD message, or signaling indication information. The seventh message may be the same as the sixth message, or may be generated by the multicast session management network element based on the sixth message, for example, based on the user plane event notification message or the control plane message.

The signaling indication information may be one piece of signaling information transmitted over an N4 link between the multicast user plane network element and the multicast session management network element. For example, when the multicast session management network element in S902 is the same as a unicast session management network element corresponding to a unicast PDU session established by the first terminal, the multicast user plane network element in S903 may be a unicast user plane network element corresponding to the unicast PDU session established by the first terminal. In this case, after determining that the first terminal is the $1^{st}$ terminal joining the multicast group, the multicast session management network element may send the signaling indication information to the multicast user plane network element over the N4 link, to request to establish the tunnel for transmitting the multicast data between the multicast user plane network element and the application server. Further, optionally, the multicast session management network element may send, to the multicast user plane network element, some configuration parameters for transmitting the multicast data. For related descriptions of the configuration parameters, refer to descriptions in S403.

For a manner in which the multicast session management network element determines whether the first terminal is the $1^{st}$ terminal joining the multicast group, refer to the manner in which the multicast user plane network element determines whether the first terminal is the $1^{st}$ terminal joining the multicast group in S404 in the method shown in FIG. 4. Details are not described again.

S904: The multicast user plane network element receives the seventh message, and sends an establishment request to the application server.

The establishment request may request to establish the tunnel for transmitting the multicast data between the multicast user plane network element and the application server. The establishment request may be a PIM message. Alternatively, the establishment request may be the same as the seventh message, that is, may be an IGMP message or an MLD message.

For example, for a process in which the multicast user plane network element sends the establishment request to the application server, refer to the process in which the multicast user plane network element sends the second message to the application server in S404. An example is as follows:

When the multicast user plane network element can be directly connected to the application server, the establishment request is the PIM message, and the multicast user plane network element directly sends the establishment request to the application server. When the multicast user plane network element cannot be directly connected to the application server, and there is an intermediate device between the multicast user plane network element and the application server, the establishment request is the IGMP message or the MLD message, the multicast user plane network element sends the establishment request to the intermediate device, and the intermediate device sends, to the application server, a PIM message that requests to establish the tunnel for transmitting the multicast data between the multicast user plane network element and the application server.

For detailed descriptions of the intermediate device and the sending process, refer to descriptions in S404. Details are not described again.

According to the method shown in FIG. 9, the unicast user plane network element may send, to the multicast session management network element, the received message that requests to join the multicast group. The multicast session management network element forwards the message to the multicast user plane network element when the terminal is the $1^{st}$ terminal that requests to join the multicast group. The multicast user plane network element sends the message to the application server, to request the application server to establish the transmission tunnel between the multicast user plane network element and the application server; and sends the multicast data to the terminal in the multicast group through the transmission tunnel. This implements normal forwarding of the multicast data, and provides a solution of forwarding the message for joining the multicast group from the multicast session management network element to the multicast user plane network element and from the multicast user plane network element to the application server. In addition, when the $1^{st}$ terminal initiates a request for joining the multicast group, the multicast session management network element triggers the multicast user plane network element to establish the tunnel between the application server and the multicast user plane network element, and the multicast data is sent, through the tunnel, to the terminal in the multicast group through the multicast user plane network element. There is no need to send, for each terminal that requests to join the multicast group, the message that requests to establish the tunnel between the application server and the multicast user plane network element, so that the signaling overheads are reduced.

It should be noted that the method shown in FIG. 9 is described by using an example in which one terminal requests to join the multicast group. It may be understood that, for other terminals such as a second terminal and a third terminal in the multicast group, messages that are initiated by the terminals and that request to join the multicast group may be forwarded to the multicast user plane network element with reference to the method shown in FIG. 9. Details are not described again.

Further, optionally, similar to an implementation of the method shown in FIG. 4, in an implementation of the method shown in FIG. 9, to reduce the signaling overheads and avoid repeatedly sending, to the application server, the message that requests to establish the tunnel for transmitting the multicast data between the multicast user plane network element and the application server, the message that requests to join the multicast group may be suppressed.

In the method shown in FIG. 9, multicast session management network elements corresponding to different terminals in the multicast group are the same, that is, are a same multicast session management network element. Multicast user plane network elements corresponding to the different terminals may be the same or different. When the multicast user plane network elements corresponding to the different terminals are different, multicast suppression may be completed only by the multicast session management network element, and the multicast user plane network elements corresponding to the different terminals only forward multicast management messages, that is, forward the multicast management messages to the application server. When the multicast user plane network elements corresponding to the different terminals are the same, that is, are a same multicast user plane network element, multicast suppression may be performed by the multicast user plane network element, or may be performed by the multicast session management network element. This is not limited. For example, multicast suppression is completed by the multicast session management network element. The process may include the following steps.

The multicast session management network element receives an eighth message, where the eighth message indicates that the second terminal is joining the multicast group, the eighth message may include identification information of the second terminal and the identification information of the multicast group, and the second terminal is not the $1^{st}$ terminal joining the multicast group.

That the multicast session management network element sends the seventh message to the multicast user plane network element includes: The multicast session management network element sends one seventh message to the multicast user plane network element. For example, when receiving a message initiated by the $1^{st}$ terminal joining the multicast group, the multicast session management network element sends the seventh message to the multicast user plane network element, to trigger establishment of the tunnel for transmitting the multicast data between the multicast user plane network element and the application server. Subsequently, when another terminal such as the second terminal, the third terminal, or a fourth terminal initiates a message for joining the multicast group, the multicast session management network element suppresses the message initiated by the another terminal, and does not send the seventh message to the multicast user plane network element.

Based on this implementation, the multicast session management network element forwards, to the multicast user plane network element, the message that is initiated for the first time and that is for joining the multicast group, and suppresses a message that is not initiated for the first time, so that repeated message sending is avoided, and the signaling overheads are reduced.

For example, it is assumed that the multicast session management network element is the M-SMF, and the M-SMF stores context information of a multicast group 1, namely, {multicast group 1, quantity of terminals that join the multicast group 1 being 0}. If the M-SMF receives the sixth message, and the sixth message indicates that a terminal 1 is joining the multicast group 1, the M-SMF determines, based on the locally stored context information of the multicast group 1, that the terminal 1 is the $1^{st}$ terminal that requests to join the multicast group 1, sends the seventh message to the application server, and updates the context information of the multicast group 1 to {multicast group 1, quantity of terminals that join the multicast group 1 being 1, terminal 1}. Subsequently, if the M-SMF receives the eighth message, and the eighth message indicates that a terminal 2 is joining the multicast group 1, the M-SMF determines, based on the locally stored context information of the multicast group 1, that the terminal 2 is the $1^{st}$ terminal that requests to join the multicast group 1. Instead of sending the seventh message to the application server, the M-SMF updates the context information of the multicast group 1 to {multicast group 1, quantity of terminals that join the multicast group 1 being 2, terminal 1, terminal 2}.

Further, optionally, in still another implementation of the method shown in FIG. 9, to improve resource utilization, when no terminal is joining the multicast group, another transmission resource and the tunnel that is for transmitting the multicast data corresponding to the multicast group may be released. Specifically, the method may include the following steps.

The multicast session management network element receives a ninth message, where the ninth message indicates that a third terminal is leaving the multicast group. If the third terminal is the last terminal that is leaving the multicast group, the multicast session management network element sends a tenth message to the multicast user plane network element, to trigger the multicast user plane network element to request the application server to release the tunnel for transmitting the multicast data.

The tenth message may request to release the tunnel for transmitting the multicast data.

The third terminal may be the first terminal, the second terminal, or another terminal in the multicast group. This is not limited. The ninth message may include identification information of the third terminal and the identification information of the multicast group.

For example, the multicast session management network element may search for the locally stored context information of the multicast group by using, as an index, the identification information of the multicast group included in the ninth message. If the quantity of terminals in the context information of the multicast group is 1, and/or the context information of the multicast group includes only the identification information of the third terminal, the multicast session management network element determines that the third terminal is the last terminal that is leaving the multicast group. Otherwise, the multicast session management network element determines that the third terminal is not the last terminal that is leaving the multicast group.

Further, optionally, the multicast session management network element deletes the locally stored context information of the multicast group, or deletes terminal information included in the locally stored context information of the multicast group.

For example, it is assumed that the multicast session management network element is the M-SMF, and the M-SMF stores context information of a multicast group 1, namely, {multicast group 1, quantity of terminals that join the multicast group 1 being 3, terminal 1, terminal 2, terminal 3}. If the M-SMF receives the ninth message, and the ninth message indicates that the terminal 1 is leaving the multicast group 1, the M-SMF determines, based on the locally stored context information of the multicast group 1, that the terminal 1 is not the last terminal that is leaving the multicast group 1. Instead of sending the tenth message to the multicast user plane network element, the M-SMF updates the context information of the multicast group 1 to {multicast group 1, quantity of terminals that join the multicast group 1 being 2, terminal 2, terminal 3}. Subsequently, if the M-SMF receives the ninth message again, and the ninth message indicates that the terminal 2 is leaving the multicast group 1, the M-SMF determines, based on the locally stored context information of the multicast group 1, that the terminal 2 is not the last terminal that is leaving the multicast group 1. Instead of sending the tenth message to the multicast user plane network element, the M-SMF updates the context information of the multicast group 1 to {multicast group 1, quantity of terminals that join the multicast group 1 being 1, terminal 3}. If the M-SMF receives the ninth message again, and the ninth message indicates that the terminal 3 is leaving the multicast group 1, the M-SMF determines, based on the locally stored context information of the multicast group 1, that the terminal 3 is the last terminal that is leaving the multicast group 1, sends the tenth message to the multicast user plane network element, and deletes the context information of the multicast group 1, or deletes the terminal information {multicast group 1} included in the context information of the multicast group 1.

Based on this implementation, when no terminal is joining the multicast group, the tunnel for transmitting the multicast data corresponding to the multicast group may be released, so that the resource utilization is improved.

With reference to the 5G communication system shown in FIG. 2, the following uses an example in which the session management network element is an SMF, the user plane network element is a UPF, the multicast session management network element is an M-SMF, the multicast user plane network element is an M-UPF, the terminal 1 and the terminal 2 join the multicast group 1, the M-SMF is selected in the manner described in the foregoing case 1, the sixth message is sent to the M-SMF, and the multicast user plane network element is selected in the foregoing manner 1, namely, an example in which unicast SMFs corresponding to unicast PDU sessions established by different terminals in the multicast group each are an M-SMF, and the unicast PDU sessions established by the different terminals correspond to a same M-SMF, to describe in detail the method shown in FIG. 9. For the process, refer to the following FIG. 10.

Figure 10:
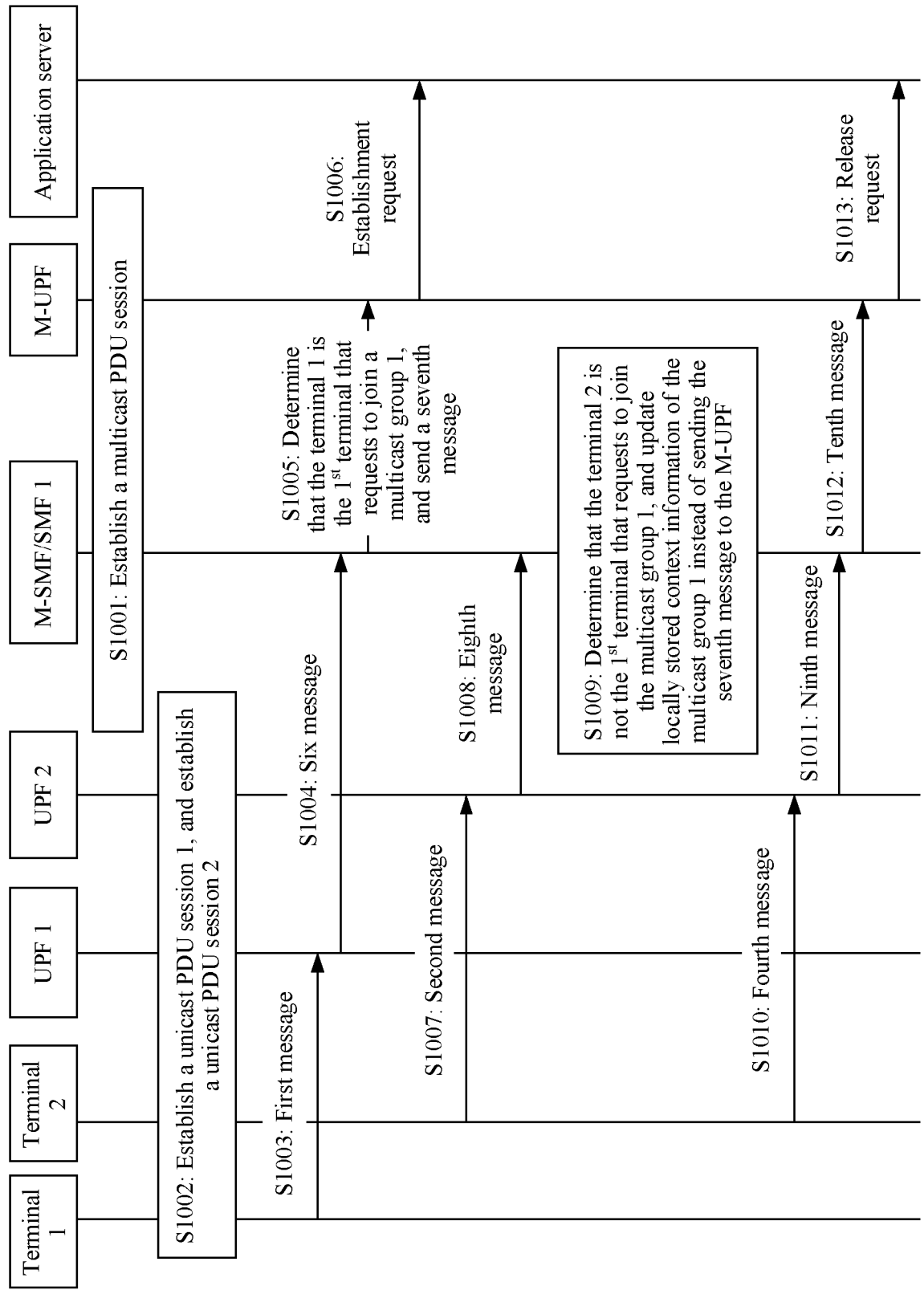
FIG. 10 is a flowchart of another message forwarding method according to an embodiment of this application.

FIG. 10 shows a message forwarding method according to an embodiment of this application. As shown in FIG. 10, the method includes the following steps.

S1001: Establish a multicast PDU session.

The multicast PDU session is used to transmit multicast data corresponding to a multicast group 1. In the method shown in FIG. 10, it is assumed that a session management network element corresponding to the multicast PDU session is an M-SMF, a user plane network element corresponding to the multicast PDU session is an M-UPF, and the M-SMF manages the M-UPF, and locally stores a correspondence between identification information of the M-UPF and identification information of the multicast group.

Specifically, for a process of establishing the multicast PDU session, refer to the current technology. Details are not described again.

S1002: A terminal 1 establishes a unicast PDU session 1, and a terminal 2 establishes a unicast PDU session 2.

The PDU session 1 established by the terminal 1 may be used to transmit data to the terminal 1. In the method shown in FIG. 10, it is assumed that a session management network element corresponding to the PDU session established by the terminal 1 is an M-SMF, a user plane network element corresponding to the PDU session established by the terminal 1 is a UPF 1, and the M-SMF manages the UPF 1.

The PDU session 2 established by the terminal 2 may be used to transmit data to the terminal 2. In the method shown in FIG. 10, it is assumed that a session management network element corresponding to the PDU session established by the terminal 2 is an M-SMF, a user plane network element corresponding to the PDU session established by the terminal 2 is a UPF 2, and the M-SMF manages the UPF 2.

Specifically, for a process in which the terminal 1 establishes the unicast PDU session 1 and the terminal 2 establishes the unicast PDU session 2, refer to the current technology. Details are not described again.

It should be noted that an execution sequence of S1001 and S1002 is not limited in this embodiment of this application. As shown in FIG. 10, S1001 may be performed before S1002, or S1002 may be performed before S1001, or S1001 and S1002 may be performed simultaneously. This is not limited.

S1003: The terminal 1 determines to join the multicast group 1, and sends a first message to the UPF 1 through the unicast PDU session 1.

The first message may indicate that the terminal 1 is joining the multicast group 1.

Specifically, for S1003, refer to descriptions in S901. Details are not described again.

S1004: The UPF 1 receives the first message, and sends a sixth message to the M-SMF.

The sixth message may indicate that the terminal 1 is joining the multicast group 1.

The sixth message in S1004 may be an IGMP message, an MLD message, or a user plane event notification message. This is not limited.

S1005: The M-SMF receives the sixth message; does not locally find context information of the multicast group 1; determines that the terminal 1 is the $1^{st}$ terminal that requests to join the multicast group 1; selects the M-UPF; sends a seventh message to the M-UPF; and locally store the context information of the multicast group 1, where the context information of the multicast group 1 may include {multicast group 1, quantity of terminals that join the multicast group 1 being 1, terminal 1}.

The seventh message may request an application server to establish a tunnel for transmitting the multicast data between the application server and the M-UPF. For related descriptions of the seventh message, refer to descriptions in the method shown in FIG. 9. Details are not described again.

For a manner in which the M-SMF selects the M-UPF, refer to descriptions in the foregoing manner 1. Details are not described again.

S1006: The M-UPF receives the seventh message, and sends an establishment request to the application server, to request the application server to establish the tunnel for transmitting the multicast data between the application server and the M-UPF.

S1007: The terminal 2 determines to join the multicast group 1, and sends a second message to the UPF 2 through the unicast PDU session 2.

The second message may indicate that the terminal 2 is joining the multicast group 1.

Specifically, for S1007, refer to descriptions in S507. Details are not described again.

S1008: The UPF 2 receives the second message, and sends an eighth message to the M-SMF.

S1009: The M-SMF receives the sixth message; locally finds the context information of the multicast group 1; determines that the terminal 2 is not the $1^{st}$ terminal that requests to join the multicast group 1; and updates the locally stored context information of the multicast group 1 instead of sending the seventh message to the M-UPF.

The updated context information of the multicast group 1 may include {multicast group 1, quantity of terminals that join the multicast group 1 being 2, terminal 1, terminal 2}.

Similarly, for a process in which another terminal in the multicast group 1 requests to join the multicast group 1, refer to descriptions in S1007 to S1009. Details are not described again.

Correspondingly, as a process corresponding to a process in which a terminal is joining the multicast group 1, a process in which a terminal is leaving the multicast group 1 is further included in the method shown in FIG. 10. For example, the terminal 1 determines to leave the multicast group 1, and sends, to the UPF 1 through the unicast PDU session 1, a message that indicates that the terminal 1 is leaving the multicast group 1. The UPF 1 receives the message, and forwards the message to the M-SMF. The M-SMF receives the message; locally searches for the context information of the multicast group 1, namely, {multicast group 1, quantity of terminals that join the multicast group 1 being 2, terminal 1, terminal 2}; determines, based on the context information of the multicast group 1, that the terminal 1 is not the last terminal that requests to leave the multicast group 1; and updates the context information of the multicast group 1, decreases the quantity of terminals by 1, and deletes the terminal 1 from terminal information. The updated context information of the multicast group 1 may include {multicast group 1, quantity of terminals that join the multicast group 1 being 1, terminal 2}.

Similarly, for a process in which another terminal in the multicast group 1 requests to leave the multicast group 1, refer to the foregoing process. Details are not described again. When the last terminal is leaving the multicast group 1, to improve resource utilization, the tunnel for transmitting the multicast data needs to be released. The following uses an example in which the terminal 2 is the last terminal that is leaving the multicast group 1 for description. As shown in FIG. 10, the method may further include the following steps.

S1010: The terminal 2 determines to leave the multicast group 1, and sends a fourth message to the UPF 2 through the unicast PDU session 2.

The fourth message may indicate that the terminal 2 is leaving the multicast group 1. For related descriptions of the fourth message, refer to the foregoing descriptions. Details are not described again.

S1011: The UPF 2 receives the fourth message, and sends a ninth message to the M-SMF.

The ninth message may indicate that the terminal 2 is leaving the multicast group 1. The ninth message may be an IGMP message, an MLD message, a user plane event notification message, or the like. This is not limited.

S1012: The M-SMF receives the ninth message; locally searches for the context information of the multicast group 1, namely, {multicast group 1, quantity of terminals that join the multicast group 1 being 1, terminal 2}; determines, based on the context information of the multicast group 1, that the terminal 2 is the last terminal that requests to leave the multicast group 1; selects the M-UPF; sends a tenth message to the M-UPF; and deletes the context information of the multicast group 1, or deletes the terminal information included in the context information of the multicast group 1.

For a manner in which the M-SMF selects the M-UPF, refer to descriptions in the foregoing manner 1. Details are not described again.

The tenth message may request to release the tunnel for transmitting the multicast data.

S1013: The M-UPF receives the ninth message, and sends a release request to the application server.

The release request may request to release the tunnel for transmitting the multicast data.

With reference to the 5G communication system shown in FIG. 2, the following uses an example in which the session management network element is an SMF, the user plane network element is a UPF, the multicast session management network element is an M-SMF, the multicast user plane network element is an M-UPF, the terminal 1 and the terminal 2 join the multicast group 1, the M-SMF is selected in the manner described in the foregoing case 1, the sixth message is sent to the M-SMF, and the multicast user plane network element is selected in the foregoing manner 2, namely, an example in which unicast SMFs corresponding to unicast PDU sessions established by different terminals in the multicast group each are an M-SMF, the unicast PDU sessions established by the different terminals correspond to a same M-SMF, and the M-SMF does not establish the multicast PDU session, to describe in detail the method shown in FIG. 9. For the process, refer to the following FIG. 11.

Figure 11:
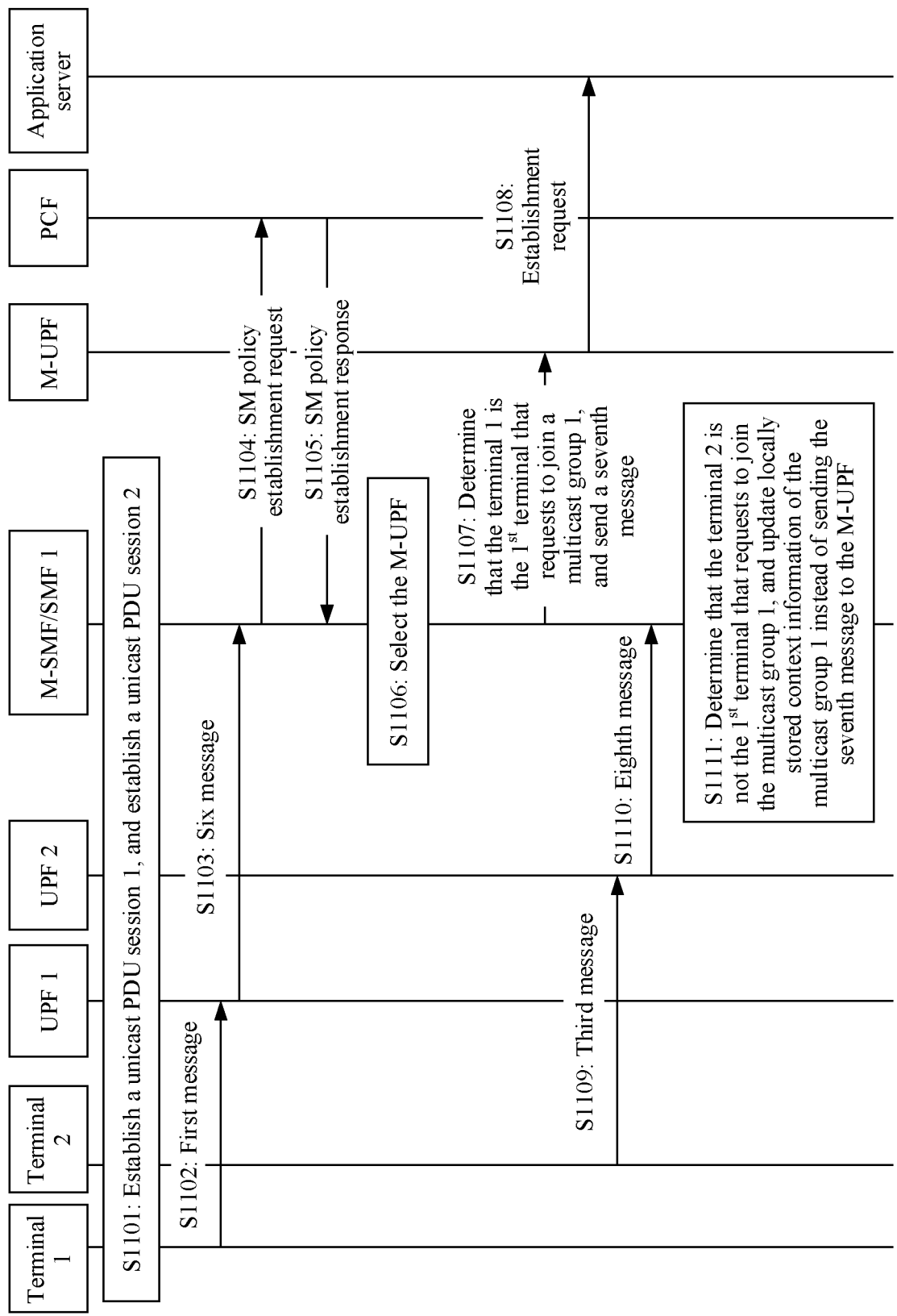
FIG. 11 is a flowchart of another message forwarding method according to an embodiment of this application.

FIG. 11 shows a message forwarding method according to an embodiment of this application. As shown in FIG. 11, the method includes the following steps.

S1101: A terminal 1 establishes a unicast PDU session 1, and a terminal 2 establishes a unicast PDU session 2.

S1101 is the same as S1002. Details are not described again.

S1102: The terminal 1 determines to join a multicast group 1, and sends a first message to a UPF 1 through the unicast PDU session 1.

Related descriptions of the first message and an execution process of S1102 are the same as those in S1003. Details are not described again.

S1103: The UPF 1 receives the first message, and sends a sixth message to an M-SMF.

For related descriptions of the sixth message, refer to the foregoing descriptions. Details are not described again.

S1104: The M-SMF receives the sixth message; does not locally find a correspondence between identification information of the multicast group and identification information of an M-UPF; determines to establish a multicast PDU session for the multicast group 1; and sends an SM policy establishment request to a PCF.

S1104 is the same as S604. Details are not described again.

S1105: The PCF receives the SM policy establishment request, and sends an SM policy establishment response to the M-SMF.

S1105 is the same as S605. Details are not described again.

S1106: The M-SMF receives the SM policy establishment response, and selects the M-UPF.

For a process in which the M-SMF selects the M-UPF, refer to descriptions in the foregoing manner 2. Details are not described again. Further, optionally, the M-SMF stores the correspondence between the identification information of the M-UPF and the identification information of the multicast group.

S1107: The M-SMF does not locally find context information of the multicast group 1; determines that the terminal 1 is the 1$^{st}$ terminal that requests to join the multicast group 1; sends a seventh message to the M-UPF; and locally stores the context information of the multicast group 1.

For related descriptions of the seventh message, refer to the foregoing descriptions. Details are not described again. For example, an N4 session modification request or an N4 session establishment request including the seventh message may be sent to the M-UPF.

The context information of the multicast group 1 may include {multicast group 1, quantity of terminals that join the multicast group 1 being 1, terminal 1}.

S1108: The M-UPF receives the seventh message, and sends an establishment request to an application server, to request the application server to establish a tunnel for transmitting multicast data between the application server and the M-UPF.

For related descriptions of the establishment request, refer to the foregoing descriptions. Details are not described again.

S1109: The terminal 2 determines to join the multicast group 1, and sends a third message to a UPF 2 through the unicast PDU session 2.

The third message may indicate that the terminal 2 is joining the multicast group 1.

Specifically, for S1109, refer to descriptions in S609. Details are not described again.

S1110: The UPF 2 receives the third message, and sends an eighth message to the M-SMF.

The eighth message may indicate that the terminal 2 is joining the multicast group 1. The eighth message may be an IGMP message, an MLD message, or a control plane message.

S1111: The M-SMF receives the eighth message; locally finds the context information of the multicast group 1; determines that the terminal 2 is not the 1$^{st}$ terminal that requests to join the multicast group 1; and updates the locally stored context information of the multicast group 1 instead of sending the seventh message to the M-UPF.

The updated context information of the multicast group 1 may include {multicast group 1, quantity of terminals that join the multicast group 1 being 2, terminal 1, terminal 2}.

Similarly, for a process in which another terminal in the multicast group 1 requests to join the multicast group 1, refer to descriptions in S1109 to S1111. Details are not described again.

Correspondingly, as a process corresponding to a process in which a terminal is joining the multicast group 1, a process in which a terminal is leaving the multicast group 1 is further included in the method shown in FIG. 11. For the specific process, refer to the process in which a terminal is leaving the multicast group 1 shown in FIG. 10. Details are not described again.

With reference to the 5G communication system shown in FIG. 2, the following uses an example in which the session management network element is an SMF, the user plane network element is a UPF, the multicast session management network element is an M-SMF, the multicast user plane network element is an M-UPF, the terminal 1 and the terminal 2 join the multicast group 1, the M-SMF is selected in the manner described in the foregoing case 2, the sixth message is sent to the M-SMF, the multicast user plane network element is selected in the foregoing manner 1, unicast SMFs corresponding to unicast PDU sessions established by different terminals in the multicast group select a same M-SMF, and the M-SMF has established the multicast PDU session, to describe in detail the method shown in FIG. 9. For the process, refer to the following FIG. 12.

Figure 12:
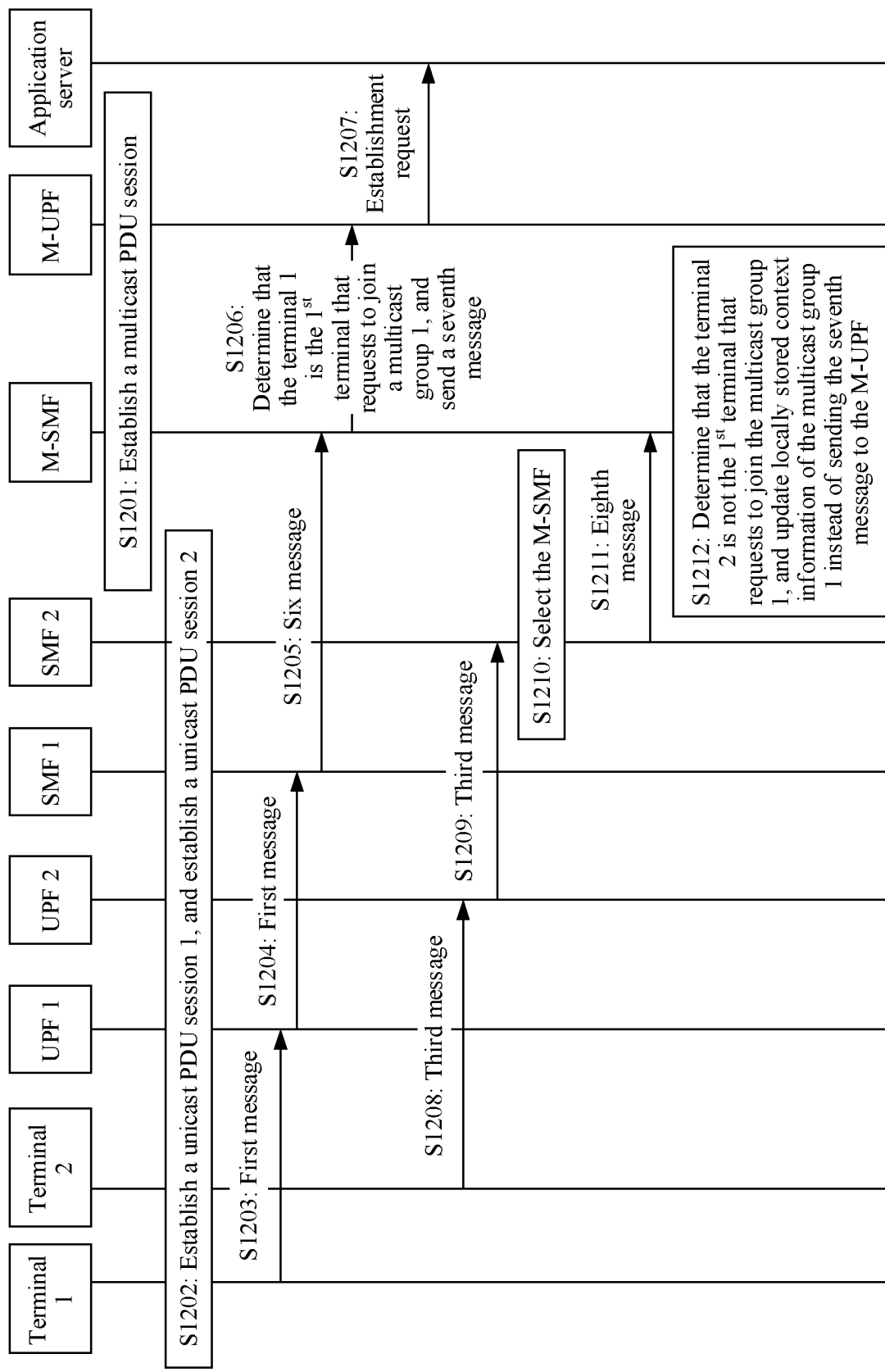
FIG. 12 is a flowchart of another message forwarding method according to an embodiment of this application.

FIG. 12 shows a message forwarding method according to an embodiment of this application. As shown in FIG. 12, the method includes the following steps.

S1201: Establish a multicast PDU session.

The multicast PDU session is used to transmit multicast data corresponding to a multicast group 1. In the method shown in FIG. 12, it is assumed that a session management network element corresponding to the multicast PDU session is an M-SMF, a user plane network element corresponding to the multicast PDU session is an M-UPF, and the M-SMF manages the M-UPF, and locally stores a correspondence between identification information of the M-UPF and identification information of the multicast group.

Specifically, for a process of establishing the multicast PDU session, refer to the current technology. Details are not described again.

S1202: A terminal 1 establishes a unicast PDU session 1, and a terminal 2 establishes a unicast PDU session 2.

The PDU session 1 established by the terminal 1 may be used to transmit data to the terminal 1. In the method shown in FIG. 12, it is assumed that a session management network element corresponding to the PDU session established by the terminal 1 is an SMF 1, a user plane network element corresponding to the PDU session established by the terminal 1 is a UPF 1, and the SMF 1 manages the UPF 1.

The PDU session 2 established by the terminal 2 may be used to transmit data to the terminal 2. In the method shown in FIG. 12, it is assumed that a session management network element corresponding to the PDU session established by the terminal 2 is an SMF 2, a user plane network element corresponding to the PDU session established by the terminal 2 is a UPF 2, and the SMF 2 manages the UPF 2.

Specifically, for a process in which the terminal 1 establishes the unicast PDU session 1 and the terminal 2 establishes the unicast PDU session 2, refer to the current technology. Details are not described again.

It should be noted that an execution sequence of S1201 and S1202 is not limited in this embodiment of this application. As shown in FIG. 12, S1201 may be performed before S1202, or S1202 may be performed before S1201, or S1201 and S1202 may be performed simultaneously. This is not limited.

S1203: The terminal 1 determines to join a multicast group 1, and sends a first message to the UPF 1 through the unicast PDU session 1.

Related descriptions of the first message and an execution process of S1203 are the same as those in S1003. Details are not described again.

S1204: The UPF 1 receives the first message, and sends the first message to the SMF 1.

S1205: The SMF 1 receives the first message, selects the M-SMF, and sends a sixth message to the M-SMF.

For a process in which the SMF 1 selects the M-SMF, refer to descriptions in the case 2 in S402. Details are not described again.

The sixth message may be an IGMP message, an MLD message, or a control plane message. Specifically, for related descriptions of the sixth message, refer to the foregoing descriptions. Details are not described again.

S1206: The M-SMF receives the sixth message; does not locally find context information of the multicast group 1; determines that the terminal 1 is the 1$^{st}$ terminal that requests to join the multicast group 1; sends a seventh message to the M-UPF based on the locally stored correspondence between the identification information of the M-UPF and the identification information of the multicast group; and locally stores the context information of the multicast group 1.

The context information of the multicast group 1 may include {multicast group 1, quantity of terminals that join the multicast group 1 being 1, terminal 1}.

S1207: The M-UPF receives the seventh message, and sends an establishment request to an application server, to request the application server to establish a tunnel for transmitting the multicast data between the application server and the M-UPF.

S1208: The terminal 2 determines to join the multicast group 1, and sends a third message to the UPF 2 through the unicast PDU session 2.

The third message may indicate that the terminal 2 is joining the multicast group 1. For related descriptions of the third message, refer to the foregoing descriptions. Details are not described again.

S1209: The UPF 2 receives the third message, and sends the third message to the SMF 2.

S1210: The SMF 2 receives the third message, and selects the M-SMF.

For a process in which the SMF 2 selects the M-SMF, refer to descriptions in the case 2 in S402. Details are not described again.

S1211: The SMF 2 sends an eighth message to the M-SMF.

The eighth message may indicate that the terminal 2 is joining the multicast group 1. The eighth message may be an IGMP message, an MLD message, or a control plane message.

S1212: The M-SMF receives the eighth message; locally finds the context information of the multicast group 1; determines that the terminal 2 is not the 1$^{st}$ terminal that requests to join the multicast group 1; and updates the locally stored context information of the multicast group 1 instead of sending the seventh message to the M-UPF.

The updated context information of the multicast group 1 may include {multicast group 1, quantity of terminals that join the multicast group 1 being 2, terminal 1, terminal 2}.

Similarly, for a process in which another terminal in the multicast group 1 requests to join the multicast group 1, refer to descriptions in S1208 to S1212. Details are not described again.

Correspondingly, as a process corresponding to a process in which a terminal is joining the multicast group 1, a process in which a terminal is leaving the multicast group 1 is further included in the method shown in FIG. 12. For the specific process, refer to the process in which a terminal is leaving the multicast group 1 shown in FIG. 10. Details are not described again.

With reference to the 5G communication system shown in FIG. 2, the following uses an example in which the session management network element is an SMF, the user plane network element is a UPF, the multicast session management network element is an M-SMF, the multicast user plane network element is an M-UPF, the terminal 1 and the terminal 2 join the multicast group 1, the M-SMF is selected in the manner described in the foregoing case 2, the sixth message is sent to the M-SMF, the multicast user plane network element is selected in the foregoing manner 2, unicast SMFs corresponding to unicast PDU sessions established by different terminals in the multicast group select a same M-SMF, and the M-SMF does not establish the multicast PDU session, to describe in detail the method shown in FIG. 9. For the process, refer to the following FIG. 13A and FIG. 13B.

Figure 13A:
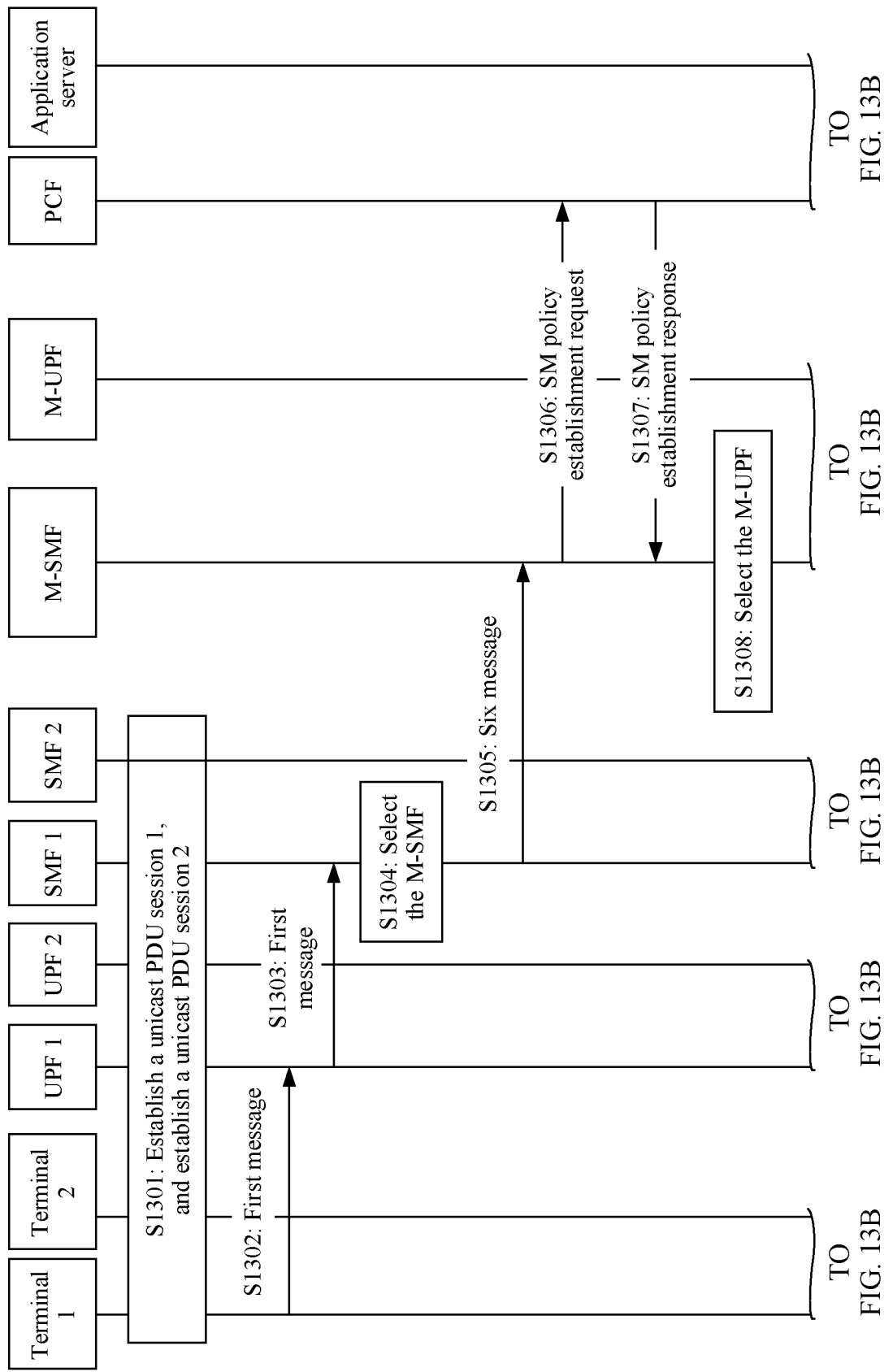

FIG. 13A and FIG. 13B show a message forwarding method according to an embodiment of this application. As shown in FIG. 13A and FIG. 13B, the method includes the following steps.

S1301: A terminal 1 establishes a unicast PDU session 1, and a terminal 2 establishes a unicast PDU session 2.

The PDU session 1 established by the terminal 1 may be used to transmit data to the terminal 1. In the method shown in FIG. 12, it is assumed that a session management network element corresponding to the PDU session established by the terminal 1 is an SMF 1, a user plane network element corresponding to the PDU session established by the terminal 1 is a UPF 1, and the SMF 1 manages the UPF 1.

The PDU session 2 established by the terminal 2 may be used to transmit data to the terminal 2. In the method shown in FIG. 12, it is assumed that a session management network element corresponding to the PDU session established by the terminal 2 is an SMF 2, a user plane network element corresponding to the PDU session established by the terminal 2 is a UPF 2, and the SMF 2 manages the UPF 2.

Specifically, for a process in which the terminal 1 establishes the unicast PDU session 1 and the terminal 2 establishes the unicast PDU session 2, refer to the current technology. Details are not described again.

S1302: The terminal 1 determines to join a multicast group 1, and sends a first message to the UPF 1 through the unicast PDU session 1.

Related descriptions of the first message and an execution process of S1302 are the same as those in S901. Details are not described again.

S1303: The UPF 1 receives the first message, and sends the first message to the SMF 1.

S1304: The SMF 1 receives the first message, and selects an M-SMF.

For a process in which the SMF 1 selects the M-SMF, refer to descriptions in the case 2 in S402. Details are not described again.

S1305: The SMF 1 sends a sixth message to the M-SMF.

S1306: The M-SMF receives the sixth message; does not locally find a correspondence between identification information of an M-UPF and identification information of the multicast group; determines to establish a multicast PDU session for the multicast group 1; and sends an SM policy establishment request to a PCF.

S1306 is the same as S1104. Details are not described again.

S1307: The PCF receives the SM policy establishment request, and sends an SM policy establishment response to the M-SMF.

S1307 is the same as S1105. Details are not described again.

S1308: The M-SMF receives the SM policy establishment response, and selects the M-UPF.

For a process in which the M-SMF selects the M-UPF, refer to descriptions in the manner 2 in the method shown in FIG. 9. Details are not described again. Further, optionally, the M-SMF stores the correspondence between the identification information of the M-UPF and the identification information of the multicast group.

S1309: The M-SMF does not locally find context information of the multicast group 1; determines that the terminal 1 is the $1^{st}$ terminal that requests to join the multicast group 1; sends a seventh message to the M-UPF; and locally stores the context information of the multicast group 1.

The context information of the multicast group 1 may include {multicast group 1, quantity of terminals that join the multicast group 1 being 1, terminal 1}.

S1310: The M-UPF receives the seventh message, and sends an establishment request to an application server, to request the application server to establish a tunnel for transmitting the multicast data between the application server and the M-UPF.

S1311: The terminal 2 determines to join the multicast group 1, and sends a third message to the UPF 2 through the unicast PDU session 2.

The third message may indicate that the terminal 2 is joining the multicast group 1.

Specifically, for S1311, refer to descriptions in an implementation of the method in FIG. 9. Details are not described again.

S1312: The UPF 2 receives the third message, and sends the third message to the SMF 2.

S1313: The SMF 2 receives the third message, and selects the M-SMF.

For a process in which the SMF 2 selects the M-SMF, refer to descriptions in the case 2 in S402. Details are not described again.

S1314: The SMF 2 sends an eighth message to the M-SMF.

S1315: The M-SMF receives the eighth message; locally finds the context information of the multicast group 1; determines that the terminal 2 is not the $1^{st}$ terminal that requests to join the multicast group 1; and updates the locally stored context information of the multicast group 1 instead of sending the seventh message to the M-UPF.

The updated context information of the multicast group 1 may include {multicast group 1, quantity of terminals that join the multicast group 1 being 2, terminal 1, terminal 2}.

Similarly, for a process in which another terminal in the multicast group 1 requests to join the multicast group 1, refer to descriptions in S1311 to S1315. Details are not described again.

Correspondingly, as a process corresponding to a process in which a terminal is joining the multicast group 1, a process in which a terminal is leaving the multicast group 1 is further included in the method shown in FIG. 13A and FIG. 13B. For the specific process, refer to the process in which a terminal is leaving the multicast group 1 shown in FIG. 10. Details are not described again.

The foregoing mainly describes the solutions provided in embodiments of this application from a perspective of interaction between nodes. It may be understood that to implement the foregoing functions, each network element, for example, the multicast user plane network element or the multicast session management network element, includes a corresponding hardware structure and/or software module for implementing each function. A person skilled in the art should be easily aware that algorithm steps in examples described with reference to embodiments disclosed in this specification can be implemented in a form of hardware, software, or a combination of hardware and computer software in the methods in embodiments of this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In embodiments of this application, functional modules of the multicast user plane network element or the multicast session management network element may be obtained through division based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example, and is merely logical function division. During actual implementation, another division manner may be used.

Figure 14:
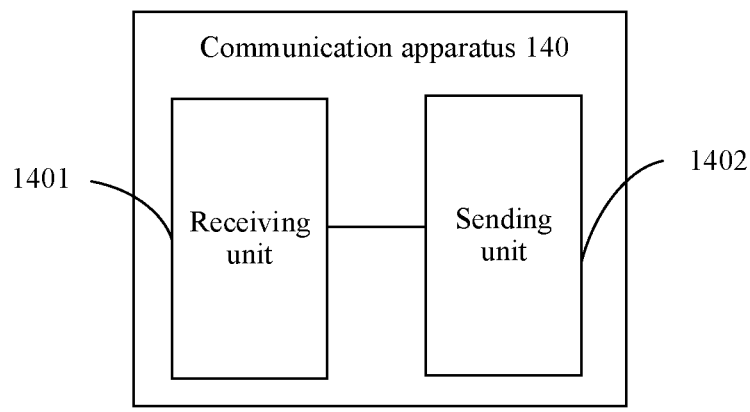
FIG. 14 is a schematic diagram of composition of a communication apparatus 140 according to an embodiment of this application.

FIG. 14 is a diagram of a structure of a communication apparatus 140. The communication apparatus 140 may be a multicast user plane network element, a chip or a system on chip in the multicast user plane network element, another apparatus that can implement a function of the multicast user plane network element in the foregoing methods, or the like. The communication apparatus 140 may be configured to perform the function of the multicast user plane network element in the foregoing method embodiments. In a feasible implementation, the communication apparatus 140 shown in FIG. 14 includes a receiving unit 1401 and a sending unit 1402.

The receiving unit 1401 is configured to receive, from a multicast session management network element, a first message that indicates that a first terminal is joining a multicast group. The multicast session management network element is configured to manage a multicast service corresponding to the multicast group, or the multicast session management network element is a session management network element that manages the multicast user plane network element. The multicast user plane network element is configured to transmit multicast data corresponding to the multicast group. For example, the receiving unit 1401 is configured to support the communication apparatus 140 in performing actions of receiving the first message in S404, S506, S608, S707, and S810.

The sending unit 1402 is configured to: if the first terminal is the $1^{st}$ terminal joining the multicast group, send, to an application server, a second message that requests to establish a tunnel for transmitting the multicast data between the multicast user plane network element and the application server. For example, the sending unit 1402 is configured to support the communication apparatus 140 in performing actions of sending the second message in S404, S506, S608, S707, and S810.

Specifically, all related content of the steps in the foregoing method embodiments shown in FIG. 4 to FIG. 8A and FIG. 8B may be cited in function descriptions of the corresponding functional modules. Details are not described herein again. The communication apparatus 140 is configured to perform a function of the multicast user plane network element in the message forwarding methods shown in FIG. 4 to FIG. 8A and FIG. 8B, and therefore can achieve same effects as the foregoing message forwarding methods.

In another implementation, the communication apparatus 140 shown in FIG. 14 includes a processing module and a communication module. The processing module is configured to control and manage an action of the communication apparatus 140. The communication module may integrate functions of the receiving unit 1401 and the sending unit 1402, and may be configured to support the communication apparatus 140 in performing steps such as S404, S506, S608, S707, and S810 and communicating with another network entity, for example, communicating with a functional module or a network entity shown in FIG. 1. The communication apparatus 140 may further include a storage module, configured to store instructions and/or data. When the instructions are executed by the processing module, the processing module may be enabled to implement the foregoing method performed by the multicast user plane network element.

The processing module may be a processor, a controller, a module, or a circuit. The processing module may implement or execute various example logical blocks described with reference to content disclosed in this application. The communication module may be a transceiver circuit, a pin, an interface circuit, a bus interface, a communication interface, or the like. The storage module may be a memory. When the processing module is the processor, the communication module is the communication interface, and the storage module is the memory, the communication apparatus 140 in this application may be the communication apparatus shown in FIG. 3.

In this embodiment of this application, the processor may be a general-purpose processor, a digital signal processor, an application-specific integrated circuit, a field programmable gate array or another programmable logic device, a discrete gate or a transistor logic device, or a discrete hardware component, and may implement or perform the methods, the steps, and logical block diagrams disclosed in this embodiment of this application. The general-purpose processor may be a microprocessor, any conventional processor, or the like. The steps in the methods disclosed with reference to embodiments of this application may be directly performed and completed through a hardware processor, or may be performed and completed through a combination of hardware in the processor and a software module.

In this embodiment of this application, the memory may be a nonvolatile memory, such as a hard disk drive (HDD) or a solid-state drive (SSD), or may be a volatile memory, such as a random access memory (RAM). The memory is any other medium that can be used to carry or store expected program code in a form of instructions or a data structure and that can be accessed by a computer, but is not limited thereto. The memory in this embodiment of this application may alternatively be a circuit or any other apparatus that can implement a storage function, and is configured to store instructions and/or data.

Figure 15:
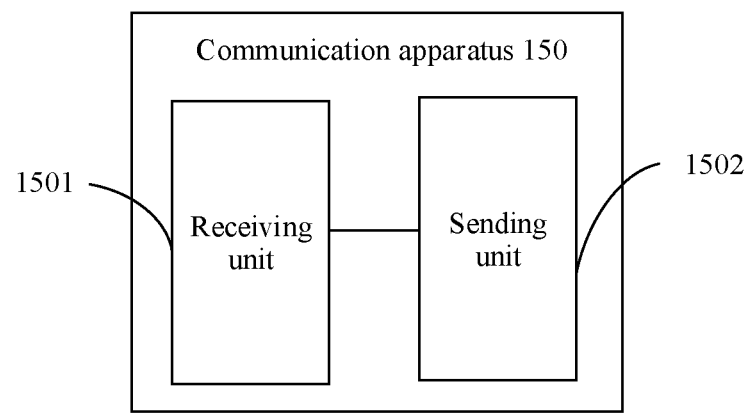
FIG. 15 is a schematic diagram of composition of a communication apparatus 150 according to an embodiment of this application.

FIG. 15 is a diagram of a structure of a communication apparatus 150. The communication apparatus 150 may be a multicast session management network element, a chip or a system on chip in the multicast session management network element, another apparatus that can implement a function of the multicast session management network element in the foregoing methods, or the like. The communication apparatus 150 may be configured to perform the function of the multicast session management network element in the foregoing method embodiments. In a feasible implementation, the communication apparatus 150 shown in FIG. 15 includes a receiving unit 1501 and a sending unit 1502.

The receiving unit 1501 is configured to receive a sixth message that indicates that a first terminal is joining a multicast group. The multicast session management network element is configured to manage a multicast service corresponding to the multicast group. In other words, the multicast session management network element is a session management network element that manages a multicast user plane network element. The multicast user plane network element is an anchor for transmitting multicast data. For example, the receiving unit 1501 may support the communication apparatus 150 in performing S903, S1005, S1104, S1206, and S1306.

The sending unit 1502 is configured to: if the first terminal is the $1^{st}$ terminal joining the multicast group, send, to the multicast user plane network element, a seventh message that requests to establish a tunnel for transmitting the multicast data between the multicast user plane network element and an application server. For example, the sending unit 1502 is configured to support the communication apparatus 150 in performing S903, S1005, S1107, S1206, and S1309.

Specifically, all related content of the steps in the foregoing method embodiments shown in FIG. 9 to FIG. 13A and FIG. 13B may be cited in function descriptions of the corresponding functional modules. Details are not described herein again. The communication apparatus 150 is configured to perform a function of the multicast session management network element in the message forwarding methods shown in FIG. 9 to FIG. 13A and FIG. 13B, and therefore can achieve same effects as the foregoing message forwarding methods.

In another implementation, the communication apparatus 150 shown in FIG. 15 includes a processing module and a communication module. The processing module is configured to control and manage an action of the communication apparatus 150. The communication module may integrate functions of the receiving unit 1501 and the sending unit 1502, and may be configured to support the communication apparatus 150 in performing steps such as S903, S1005, S1104, S1206, and S1306 and communicating with another network entity, for example, communicating with a functional module or a network entity shown in FIG. 1. The communication apparatus 150 may further include a storage module, configured to store instructions and/or data. When the instructions are executed by the processing module, the processing module may be enabled to implement the foregoing method performed by the multicast user plane network element.

The processing module may be a processor, a controller, a module, or a circuit. The processing module may implement or execute various example logical blocks described with reference to content disclosed in this application. The communication module may be a transceiver circuit, a pin, an interface circuit, a bus interface, a communication interface, or the like. The storage module may be a memory. When the processing module is the processor, the communication module is the communication interface, and the storage module is the memory, the communication apparatus 150 in this application may be the communication apparatus shown in FIG. 3.

Figure 16:
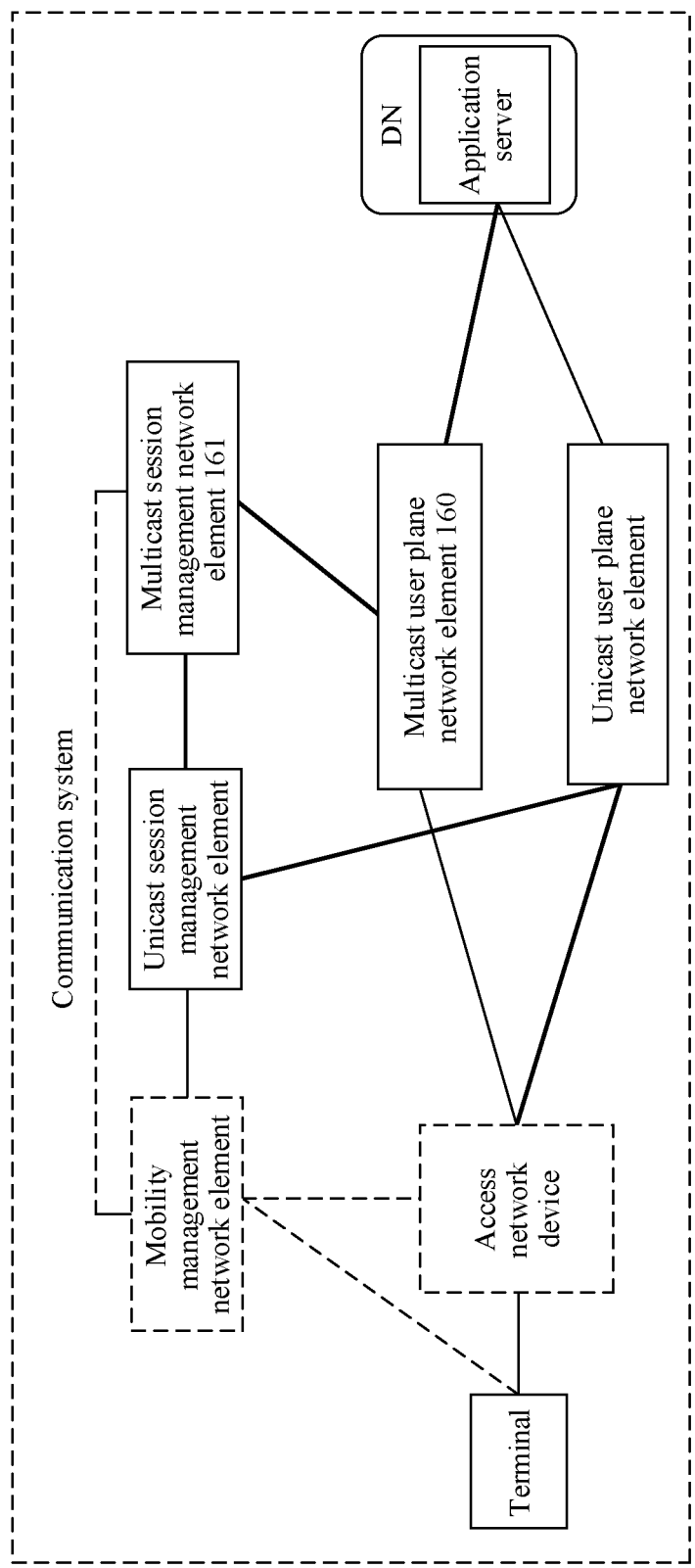
FIG. 16 is a schematic diagram of composition of a communication system according to an embodiment of this application.

FIG. 16 is a diagram of a structure of a communication system according to an embodiment of this application. As shown in FIG. 16, the communication system may include a terminal, an access network device, a mobility management network element, a unicast session management network element, a unicast user plane network element, a multicast user plane network element 160, and a multicast session management network element 161. The access network device and the mobility management network element shown in FIG. 16 may be optional network elements in this application.

The multicast user plane network element 160 may have a function of the communication apparatus 140. The multicast session management network element 161 may have a function of the communication apparatus 150.

In an example, the multicast session management network element 161 is configured to: receive a first message that is sent by the unicast user plane network element and that indicates that the terminal is joining a multicast group, and send the first message to the multicast user plane network element 160.

The multicast user plane network element 160 may be configured to: receive the first message; and if the terminal is the 1$^{st}$ terminal joining the multicast group, send, to an application server, a second message that requests to establish a tunnel for transmitting multicast data between the multicast user plane network element 160 and the application server.

In another example, the multicast session management network element 161 is configured to: receive a sixth message that indicates that the terminal is joining a multicast group; and when the terminal is the 1$^{st}$ terminal joining the multicast group, send, to the multicast user plane network element 160, a seventh message that requests to establish a tunnel for transmitting multicast data between the multicast user plane network element 160 and an application server.

Specifically, for a specific implementation process of the multicast user plane network element 160, refer to an execution process of the multicast user plane network element in the method embodiments in FIG. 4 to FIG. 8A and FIG. 8B. Details are not described herein again. For a specific implementation process of the multicast session management network element 161, refer to an execution process of the multicast session management network element in the method embodiments in FIG. 9 to FIG. 13A and FIG. 13B. Details are not described herein again.

An embodiment of this application further provides a computer-readable storage medium. All or some of the procedures in the foregoing method embodiments may be completed by a computer program instructing related hardware. The program may be stored in the computer-readable storage medium. When the program is executed, the procedures of the foregoing method embodiments may be included. The computer-readable storage medium may be an internal storage unit of the terminal apparatus according to any one of the foregoing embodiments, for example, including a data transmit end and/or a data receive end. For example, the computer-readable storage medium may be a hard disk or a memory of the terminal apparatus. Alternatively, the computer-readable storage medium may be an external storage device of the terminal apparatus, for example, a plug-in hard disk, a smart media card (SMC), a secure digital (SD) card, or a flash card that is configured on the terminal apparatus. Further, the computer-readable storage medium may include both an internal storage unit and an external storage device of the terminal apparatus. The computer-readable storage medium is configured to store the computer program and other programs and data that are required by the terminal apparatus. The computer-readable storage medium may be further configured to temporarily store data that has been output or is to be output.

An embodiment of this application further provides computer instructions. All or some of the procedures in the foregoing method embodiments may be implemented by the computer instructions instructing related hardware (such as a computer, a processor, a network device, and a terminal). The instructions may be stored in the foregoing computer-readable storage medium.

It should be noted that, in the specification, claims, and accompanying drawings of this application, terms "first", "second", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this application, "at least one (item)" means one or more, "a plurality of" means two or more, "at least two (items)" means two, three, or more, and "and/or" is used to describe an association relationship between associated objects, and indicates that there may be three relationships. For example, "A and/or B" may indicate that only A exists, only B exists, and both A and B exist, where A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one (piece) of a, b, or c may indicate a, b, c, "a and b", "a and c", "b and c", or "a, b, and c", where a, b, and c may be singular or plural.

It should be understood that in embodiments of this application, "B corresponding to A" indicates that B is associated with A. For example, B may be determined based on A. It should be further understood that determining B based on A does not mean that B is determined based only on A. B may alternatively be determined based on A and/or other information. In addition, in embodiments of this application, "connection" means various connection manners such as a direct connection or an indirect connection, for implementing communication between devices. This is not limited in embodiments of this application.

In embodiments of this application, unless otherwise specified, "transmission" (transmit) refers to bidirectional transmission, and includes a sending action and/or a receiving action. Specifically, "transmission" in embodiments of this application includes data sending, data receiving, or data sending and receiving. In other words, data transmission herein includes uplink data transmission and/or downlink data transmission. Data may include a channel and/or a signal. The uplink data transmission is uplink channel transmission and/or uplink signal transmission, and the downlink data transmission is downlink channel transmission and/or downlink signal transmission. In embodiments of this application, a "network" and a "system" express a same concept, and a communication system is a communication network.

The foregoing descriptions about the implementations allow a person skilled in the art to clearly understand that, for the purpose of convenient and brief description, division into the foregoing functional modules is used as an example for illustration. During actual application, the foregoing functions may be allocated to different functional modules for implementation based on a requirement, that is, an inner structure of an apparatus is divided into different functional modules to implement all or some of the foregoing functions.

In the several embodiments provided in this application, it should be understood that the disclosed apparatus and method may be implemented in other manners. For example, the described apparatus embodiment is merely an example. For example, division into the modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may be one or more physical units, to be specific, may be located in one place, or may be distributed at a plurality of different places. Some or all of the units may be selected based on an actual requirement to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions of embodiments of this application essentially, or the part contributing to the current technology, or all or some of the technical solutions may be implemented in a form of a software product. The software product is stored in a storage medium and includes several instructions for instructing a device, where for example, the device may be a single-chip microcomputer or a chip, or a processor to perform all or some of the steps of the methods in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A message forwarding method, comprising:
   receiving, by a multicast session management network element, a sixth message indicating that a terminal is joining a multicast group, wherein the multicast session management network element is configured to manage a multicast session corresponding to the multicast group; and
   if the terminal is the $1^{st}$ terminal joining the multicast group, sending, by the multicast session management network element, a seventh message to a multicast user plane network element, wherein the seventh message is used for establishing a tunnel for transmitting multicast data between the multicast user plane network element and an application server.

2. The method according to claim 1, wherein the receiving, by the multicast session management network element, the sixth message comprises:
   receiving, by the multicast session management network element, the sixth message from a unicast session management network element, wherein the unicast session management network element is a session management network element that manages a unicast user plane network element.

3. The method according to claim 1, further comprising:
   determining, by the multicast session management network element, that the terminal is the $1^{st}$ terminal joining the multicast group.

4. The method according to claim 3, wherein the determining, by the multicast session management network element, that the terminal is the $1^{st}$ terminal joining the multicast group comprises:
   when context information of the multicast group does not exist locally in the multicast session management network element, determining that the terminal is the $1^{st}$ terminal joining the multicast group; or
   when context information the multicast group locally existing in the multicast session management network element does not comprise terminal information, determining that the terminal is the $1^{st}$ terminal joining the multicast group.

5. The method according to claim 1, further comprising:
   receiving, by the multicast session management network element, an eighth message, wherein the eighth message indicates that a terminal is joining the multicast group; and
   the sending, by the multicast session management network element, a seventh message to a multicast user plane network element comprises:
   sending, by the multicast session management network element, a single seventh message to the multicast user plane network element.

6. The method according to claim 1, wherein after sending, by the multicast session management network element, the seventh message to the multicast user plane network element, the method further comprises:
   receiving, by the multicast session management network element, an eighth message indicating that a second terminal is joining the multicast group; and skipping, by the multicast session management network element, sending an eleventh message to the multicast user plane network element, wherein the eleventh message is used for establishing a tunnel for transmitting the multicast data between the multicast user plane network element and the application server.

7. The method according to claim 1, wherein
the sixth message is a control plane message, and the seventh message is an internet group management protocol (IGMP) message, a multicast listener discovery protocol (MLD) message, or signaling indication information;
the sixth message is an IGMP message, and the seventh message is an IGMP message or signaling indication information; or
the sixth message is an MLD message, and the seventh message is an MLD message or signaling indication information.

8. The method according to claim 1, further comprising:
receiving, by the multicast session management network element, a ninth message indicating that a terminal is leaving the multicast group; and
if the terminal leaving the multicast group is the last terminal leaving the multicast group, sending, by the multicast session management network element, a tenth message to the multicast user plane network element, wherein the tenth message requests to release the tunnel for transmitting the multicast data.

9. The method according to claim 1, wherein the establishing the tunnel for transmitting the multicast data between the multicast user plane network element and the application server comprises:
connecting the multicast user plane network element to an N6 multicast distribution tree associated with the multicast group in which the application server is used as a data source, wherein N6 is an interface between the multicast user plane network element and a data network (DN), the DN is connected to the application server, and the N6 multicast distribution tree is a forwarding path between a sender and a receiver of the multicast data.

10. A communication system, wherein the communication system comprises:
a multicast session management network element, comprising a first processor coupled to a first memory and configured to receive a sixth message indicating that a terminal is joining a multicast group; and if the terminal is the $1^{st}$ terminal joining the multicast group, send a seventh message to a multicast user plane network element; and
the multicast user plane network element, comprising a second processor coupled to a second memory and configured to: receive the seventh message, and establish, according to the seventh message, a tunnel for transmitting multicast data between the multicast user plane network element and an application server.

11. The system according to claim 10, wherein the second processor of the multicast user plane network element is further configured to:
connect the multicast user plane network element to an N6 multicast distribution tree associated with the multicast group in which the application server is used as a data source, wherein N6 is an interface between the multicast user plane network element and a data network (DN), the DN is connected to the application server, and the N6 multicast distribution tree is a forwarding path between a sender and a receiver of the multicast data.

12. The system according to claim 10, wherein the first processor of the multicast session management network element is further configured to:
receive an eighth message indicating that a second terminal is joining the multicast group; and
skip sending an eleventh message to the multicast user plane network element, wherein the eleventh message is used for establishing a tunnel for transmitting the multicast data between the multicast user plane network element and the application server.

13. The system according to claim 10, wherein
the first processor of the multicast session management network element is further configured to: receive a ninth message indicating that a terminal is leaving the multicast group; and if the terminal leaving the multicast group is the last terminal leaving the multicast group, send a tenth message to the multicast user plane network element, wherein the tenth message requests to release the tunnel for transmitting the multicast data.

14. A communication apparatus, wherein the communication apparatus comprises:
one or more processors; and
a communication interface;
wherein the one or more processors and the communication interface are configured to support the communication apparatus in performing the steps of:
receiving a sixth message, wherein the sixth message indicates that a terminal is joining a multicast group; and
if the terminal is the $1^{st}$ terminal joining the multicast group, sending a seventh message to a multicast user plane network element, wherein the seventh message is used for establishing a tunnel for transmitting multicast data between the multicast user plane network element and an application server.

15. The apparatus according to claim 14, wherein the one or more processors are further configured to:
receive an eighth message, wherein the eighth message indicates that a terminal is joining the multicast group; and
skip sending an eleventh message to the multicast user plane network element, wherein the eleventh message is used for establishing a tunnel for transmitting the multicast data between the multicast user plane network element and the application server.

16. The apparatus according to claim 14, wherein the one or more processors are further configured to:
receiving the sixth message from a unicast session management network element.

17. The apparatus according to claim 14, wherein the one or more processors are further configured to:
receive a ninth message, wherein the ninth message indicates that a terminal is leaving the multicast group; and
if the terminal leaving the multicast group is the last terminal that is leaving the multicast group, send a tenth message to the multicast user plane network element, wherein the tenth message requests to release the tunnel for transmitting the multicast data.

18. The method according to claim 1, further comprising:
receiving, by the multicast user plane network element, the seventh message; and
establishing, by the multicast user plane network element according to the seventh message, a tunnel for transmitting multicast data between the multicast user plane network element and an application server.

19. A non-transitory computer-readable storage medium storing instructions, that when executed by one or more processors, perform operations comprising:
  receiving a sixth message indicating that a terminal is joining a multicast group; and
  if the terminal is the $1^{st}$ terminal joining the multicast group, sending a seventh message to a multicast user plane network element, wherein the seventh message is used for establishing a tunnel for transmitting multicast data between the multicast user plane network element and an application server.

20. The non-transitory computer readable storage medium according to claim 19, wherein the operations further comprise:
  receiving a ninth message indicating that a terminal is leaving the multicast group; and
  if the terminal leaving the multicast group is the last terminal that is leaving the multicast group, sending a tenth message to the multicast user plane network element, wherein the tenth message requests to release the tunnel for transmitting the multicast data.

* * * * *